United States Patent [19]

Inoue et al.

[11] Patent Number: 5,587,803

[45] Date of Patent: Dec. 24, 1996

[54] DIGITAL SIGNAL RECORDING AND REPRODUCING APPARATUS AND ERROR-CORRECTING APPARATUS

[75] Inventors: Tohru Inoue; Ken Onishi; Sadayuki Inoue; Ikuo Okuma, all of Nagaokakyo, Japan

[73] Assignee: Mitsubishi Denki Kabushiki Kaisha, Tokyo, Japan

[21] Appl. No.: 432,703

[22] Filed: May 2, 1995

Related U.S. Application Data

[63] Continuation of Ser. No. 37,372, Mar. 26, 1993, abandoned.

[30] Foreign Application Priority Data

| Apr. 1, 1992 | [JP] | Japan | 4-079571 |
| Apr. 28, 1992 | [JP] | Japan | 4-109804 |
| Mar. 2, 1993 | [JP] | Japan | 5-067550 |

[51] Int. Cl.$^6$ ................................................. H04N 9/79
[52] U.S. Cl. .................. 386/33; 348/403; 348/420; 371/37.1
[58] Field of Search ..................... 358/310, 314, 358/335, 336; 348/607, 390, 391, 603, 620; 360/32, 33.1, 38.1, 53; 371/37.1, 40.1; H04N 9/79, 9/88

[56] References Cited

U.S. PATENT DOCUMENTS

| 4,792,953 | 12/1988 | Pasdera et al. | 358/314 |
| 4,914,661 | 4/1990 | Mester | 360/53 |
| 5,073,821 | 12/1991 | Juri | 348/405 |
| 5,191,436 | 3/1993 | Yonemitsu | 358/335 |
| 5,237,424 | 8/1993 | Nishino et al. | 358/310 |
| 5,264,970 | 11/1993 | Tsia et al. | 360/53 |
| 5,272,528 | 12/1993 | Juri et al. | 348/403 |

FOREIGN PATENT DOCUMENTS

6430344  2/1989  Japan .

OTHER PUBLICATIONS

"An Experimental Home–Use Digital VCR With Three Dimensional DCT and Superimposed Error Correction Coding" (IEEE Trans. Consumer Electronics, vol. 37, No. 3, pp. 252–260, Aug. 1991) Onishi et al.

"A Note On Error Correcting Code Structure For Home Use Digital VTR Using Punctured Codes" (Institute of Electronics, Information and Communication Engineers, Technical Research Report IT91–15, May 14, 1991) Yoshida et al.

*Primary Examiner*—Thai Q. Tran
*Assistant Examiner*—Khoi Truong

[57] ABSTRACT

Fast speed playback is performed with a reduced error-correcting capability as compared with that for normal speed playback. Information of K symbols is encoded with a first error-correcting code C1 and appended with (N−K) check symbols. After that, m symbols out of the check symbols are punctured, and the information of K symbols is divided into a block of $K_1$ symbols and a block of $K_2$ symbols, the block of $K_1$ symbols being further encoded with a second error-correcting code Cm and appended with $m_1$ check symbols for error correction. For efficient error-correction coding of auxiliary data which is usually not used but which becomes necessary on occasions, the presence or absence of auxiliary data is written in ID information, and the number of error-correcting check symbols is changed accordingly.

18 Claims, 23 Drawing Sheets

4:1:1 METHOD

|       | 51  | 24  |
|-------|-----|-----|
| MB0   | MB1 | HAC |
| MB2   | MB3 | HAC |
| MB4   | HAC |     |

Fig. 21(a)

| 5        | 1         | 51 | 4   | 75        | 8   |
|----------|-----------|----|-----|-----------|-----|
| SYNC+ ID | AUX | MB | Cm  | MB OR HAC | C1  |

Fig. 21(b)

⇩ ENCODING

ESTIMATION

⇩ TRANSMISSION (RECORD)
⇩ RECEPTION (REPRODUCTION)

⇩ DECODING INSERTION

REPRODUCED DATA

ENCODING  AUXILIARY DATA

TRANSMISSION (RECORD)  ESTIMATION (PUNCTURE)
RECEPTION (REPRODUCTION)

DECODING  ERASURE

REPRODUCED DATA

DIGITAL SIGNAL RECORDING AND REPRODUCING APPARATUS AND ERROR-CORRECTING APPARATUS

This application is a continuation of application Ser. No. 08/037,372 filed on Mar. 26, 1993, now abandoned.

BACKGROUND OF THE INVENTION

1. Field of the Invention

The present invention relates to a rotary-head digital magnetic recording and reproducing apparatus that digitally records video and audio signals on magnetic tape, and in particular, to a fast-speed playback technique for the same.

2. Description of Related Art

Rotary-head digital magnetic recording and reproducing apparatus of various formats have been announced heretofore. As a typical example of such apparatus, a professional digital VTR for broadcasting use, employing a system known as the D-2 format, will be described below.

FIG. 1 is a simplified block diagram showing an example of a digital VTR employing the D-2 format. In FIG. 1, the reference numeral 201 is a video signal input terminal, 202 is an audio signal input terminal, 203 and 204 are A/D converters, 205 is a digital recording signal processor, 207 is a digital modulation processor, 208 and 209 are recording amplifiers, 210 and 211 are record/playback selecting switches, 212 and 213 are head selecting switches, 214, 215, 216, and 217 are record/playback heads, 218 and 219 are playback amplifiers, 220 is a digital demodulation processor, 221 is a digital reproducing signal processor, 224 and 225 are D/A converters, 226 is a video signal output terminal, and 227 is an audio signal output terminal.

FIG. 2 shows the track format for recording on tape employed in the D-2 format digital VTR. As shown in FIG. 2, in the D-2 format, a cue track, a time code track, and a control track are recorded along the longitudinal direction of the magnetic tape, while the video and audio signals are digitally recorded on tracks that are produced diagonally across the magnetic tape. Two channels of audio signals are recorded on each side of the video signal, so that there are a total of four audio channels recorded per track.

The operation of the above VTR will now be described with reference to FIG. 1. The composite video signal input at the input terminal 201 is sampled by the A/D converter 203 at a frequency four times the subcarrier frequency, i.e., at 14.318 MHz, for quantization into eight-bit words. On the other hand, the audio signal input at the input terminal 202 is sampled at 48 kHz, and quantized into 20-bit words, using the A/D converter 204. For simplicity, only one channel of audio signal input is shown in FIG. 1, but actually, there are four audio input channels. The digitized video and four-channel audio signals are supplied to the digital recording signal processor 205. The digital recording signal processor 205 processes the video and four-channel audio signals with respect to the time axis in accordance with the format and appends error-correcting codes to them. The error-correcting codes are appended to the video and four-channel audio signals independently of one another. In the digital modulation processor 207, digital modulation processing is performed on the signals in accordance with a prescribed modulation scheme. The signals output from the digital modulation processor 207 are fed to the recording amplifiers 208 and 209, passed through the record/playback selecting switches 210 and 211, and distributed via the head selecting switches 212 and 213 over the record/playback heads 214, 215, 216, and 217 for recording onto the magnetic tape in accordance with the track format shown in FIG. 2. In the above format, the data rate after error-correcting coding is 127M bits/sec. and the video signals for one field are recorded on six separate tracks.

Reproduction of the signals is performed in the following manner. The signals reproduced by the respective heads 214, 215, 216, and 217 are fed, via the head selecting switches 212, 213 and the record/playback selecting switches 210, 211, to the playback amplifiers 218, 219 which amplify the reproduced signals before supplying them to the digital demodulation processor 220. The digital signals demodulated by the digital demodulation processor 220 are passed to the digital reproducing signal processor 221 which performs error-correcting decoding and other processing to decode the digital signals into a data train of ordinary video and four-channel audio signals for output. The signals output from the digital reproducing signal processor 221 are converted by the D/A converters 224 and 225 back into the original video and four-channel audio signals.

FIG. 3 shows a format of error-correcting codes proposed by Ken Onishi, Takashi Itow, Hirofumi Nishikawa, Kazuhiro Sugiyama, Hideo Yoshida, Masato Nagasawa, Kihei Ido, Kunihiko Nakagawa, Yoshinobu Ishida, and Satoshi Kunii, in "An Experimental Home-Use Digital VCR with Three Dimensional DCT and Superimposed Error Correction Coding," IEEE Trans. Consumer Electronics, vol. 37, no. 3, pp. 252–260, August 1991 (Reference 1). According to this format, the video signal V is first encoded with an (N, K, $d_1$) code to produce horizontal error-correcting codewords C1, and then encoded with an (L+Q, L, $d_2$) to produce vertical error-correcting codewords C2. In an (n, k, d) code, n denotes the codeword length, k the information length, and d the distance between codewords. S designates a superimposing code; additional information of m× Ls is vertically encoded with an (Ls+Qs, Ls, $d_3$) code (in general Ls<L, Qs>Q) and superimposed on the check symbol area C1 to obtain a total of (Ls+Qs)×N codewords. The additional information can thus be appended to the ordinary information area as necessary.

A method of using punctured coding instead of superimposed coding is disclosed by Hideo Yoshida, Takahiko Nakamura, Atsuhiro Yamagishi, Tohru Inoue, and Ken Onishi, in "A Note on Error Correcting Code Structure For Home Use Digital VTR using Punctured Codes" Institute of Electronics, Information and Communication Engineers, Technical Research Report IT91-15, May 14, 1991 (Reference 2). With this method also, additional information can be appended as necessary. It is also discussed in the report that when decoding using the above method, punctured portions of information are regarded as erasures and erasure correction is performed to reconstruct the information. That is, error correction is performed using the horizontal codewords C1, and errors (such as long burst errors) that cannot be corrected with the C1 codewords are corrected as erasures.

Accordingly, the professional digital VTR of the above construction offers such features as high reliability, high image quality, high sound quality, and sophisticated editing functions that are needed for professional use. The above digital VTR, however, has had the problem that degradation of image quality is caused in fast speed playback mode in which dynamic tracking following (DTF) is not performed. The coding format shown in FIG. 3 involves the double encoding of information, i.e. in both horizontal and vertical directions, and therefore, when applied to digital VTRs, the code offers a powerful error-correcting capability and ensures sufficiently high reliability in normal playback mode. However, in fast speed playback mode not using DTF, since the heads are moved in such a way to traverse the tracks, it is only possible to reproduce part of the C1 code produced along the track direction, and therefore, it is necessary to devise a means for reproducing the information by making the maximum use of that part of the code.

There has also been the problem that efficient error-correction coding is not possible for auxiliary data that is usually not necessary but that becomes necessary on occasions.

SUMMARY OF THE INVENTION

It is a primary object of the invention to provide a digital signal recording and reproducing apparatus, and an error-correcting apparatus, capable of minimizing image quality degradation in fast-speed playback mode.

According to a first digital signal recording and reproducing apparatus of the invention, the error-correcting capability is switched between fast speed and normal speed playback modes in such a way that the capability is reduced for fast speed playback mode as compared to that for normal speed playback mode, thereby preventing erroneous decoding during fast speed playback mode and thus minimizing image quality degradation in either mode.

According to a second digital signal recording and reproducing apparatus of the invention, the first apparatus is adapted to perform double coding using at least two kinds of error-correcting codes that are combined in the form of product codes or the like. In normal speed playback mode, the two kinds of codes are used to provide a high error-correcting capability and to obtain a reproduced image with high quality; on the other hand, in fast speed playback mode, only the C1 code that is formed in the track recording direction is used, and furthermore, the error-correcting capability of the C1 code is lowered as compared to that for normal speed playback mode, thereby preventing erroneous decoding and image quality degradation during fast speed playback.

According to a third digital signal recording and reproducing apparatus of the invention, the first apparatus is adapted so that when uncorrectable errors are detected during fast speed playback, writing of reproduced data to memory is inhibited and previously reproduced data is used for interpolation, to prevent image quality degradation.

During fast speed playback that does not use DTF, codeword errors increase rapidly since the heads are moved in such a way as to traverse the recorded tracks. In a fourth digital signal recording and reproducing apparatus of the invention, the error-correcting capability of the error-correcting code used is set at a lower level for fast speed playback than for normal speed playback, to prevent image quality degradation.

According to a first error-correcting apparatus of the invention, information of K symbols is encoded with a C1 code and m symbols out of check symbols are punctured. The information of K symbols is then divided into a block of $K_1$ symbols and a block of $K_2$ symbols, and the first block of $K_1$ symbols is further encoded with a Cm code. This allows the encoding method to be varied according to the condition of generated errors, with double error correction being accomplished by the Cm and C1 codes. Thus, the flexible error-correcting system is provided that is capable of varying the decoding procedure according to the condition of generated errors and that matches the time required for the decoding and the required level of reliability.

According to a second error-correcting apparatus of the invention, the first error-correcting apparatus is adapted to use superimposed code instead of punctured code. Therefore, when the Cm code is not used, other additional information can be transmitted or recorded with a specified level of reliability.

According to a third error-correcting apparatus of the invention, the first error-correcting apparatus is adapted so that Cm received words are decoded first, and then, data after Cm correction are used to decode C1 received words to correct errors. Therefore, the first block of $K_1$ symbols can be error-corrected with increased reliability.

According to a fourth error-correcting apparatus of the invention, two-dimensional data of $L \times K_1$ is encoded with C1 and then punctured, after which the information part of the data is divided into two areas, $D_1$ and $D_2$, and the area $D_1$ is further encoded with Cm. Therefore, the data in the area D can be recorded and reproduced or transmitted with increased reliability compared with the data in the area $D_2$.

According to a fifth error-correcting apparatus of the invention, the fourth error-correcting apparatus is adapted so that check symbols of the Cm code are placed over the punctured area. The entire code amount does not increase because of the Cm coding.

According to a sixth error-correcting apparatus of the invention, in a rotary-head digital signal magnetic recording and reproducing apparatus, a C1 code is used for decoding during normal speed playback, and a Cm code having a shorter code length than C1 is used for decoding during fast speed playback. This serves to minimize image quality degradation in either playback mode.

According to a seventh error-correcting apparatus of the invention, in a rotary-head digital signal recording and reproducing apparatus, in slow playback and still playback modes, the Cm code is decoded prior to the decoding of the C1 code. This serves to enhance the error-correcting performance and is effective in minimizing image quality degradation.

According to an eighth error-correcting apparatus of the invention, in a rotary-head digital signal recording and reproducing apparatus, when the Cm code is not used, other additional information such as voice information is recorded in punctured or superimposed areas.

According to a ninth error-correcting apparatus of the invention, the luminance signal and the color-difference signals after compression are grouped into macroblocks in a prescribed proportion and placed in predetermined positions in an error-correcting code, and bit data overflown from the macroblocks are sequentially placed in a HAC area. Since video data is transmitted or recorded in units of macroblocks with preference for low-frequency components, a constant proportion of the low-frequency components of the video data is always transmitted or recorded as fixed data. Even during fast speed playback or special mode playback, the macroblocks placed in positions close to the synchronizing pattern are reproduced without fail so that a coarse image can be reproduced from the low-frequency components.

According to a tenth error-correcting apparatus of the invention, when there is a need to transmit auxiliary data in addition to fixed data, the presence or absence of auxiliary data is checked using an ID area or the like. When there is no auxiliary data, "0" symbols, the number of which is equal to Kx symbols reserved for auxiliary data, is added to the fixed data. The combined data is encoded, and then, the Kx "0" symbols are deleted before transmission. At the receiving side, the Kx "0" symbols are inserted to decode the received data. On the other hand, when there is auxiliary data added, the fixed data of Kf symbols and the auxiliary data of Kx symbols are encoded together, and from the obtained check symbols, Kx symbols equivalent to the auxiliary data length are punctured to make the codeword length equal to the codeword length used when there is no auxiliary data. Transmission and reception or recording and reproduction are performed using the thus formed codeword. It is thus possible to cope with the presence or absence of auxiliary data without compromising on the error-correcting capability.

The above and further objects and features of this invention will more fully be apparent from the following detailed description with accompanying drawings.

BRIEF DESCRIPTION OF THE DRAWINGS

FIG. 21(a) is a diagram showing a coding format.

FIG. 21(b) is a diagram showing a coding format.

DESCRIPTION OF THE PREFERRED EMBODIMENTS

The preferred embodiments of the invention will now be described below with reference to the accompanying drawings.

(Embodiment 1)

Figure 1:
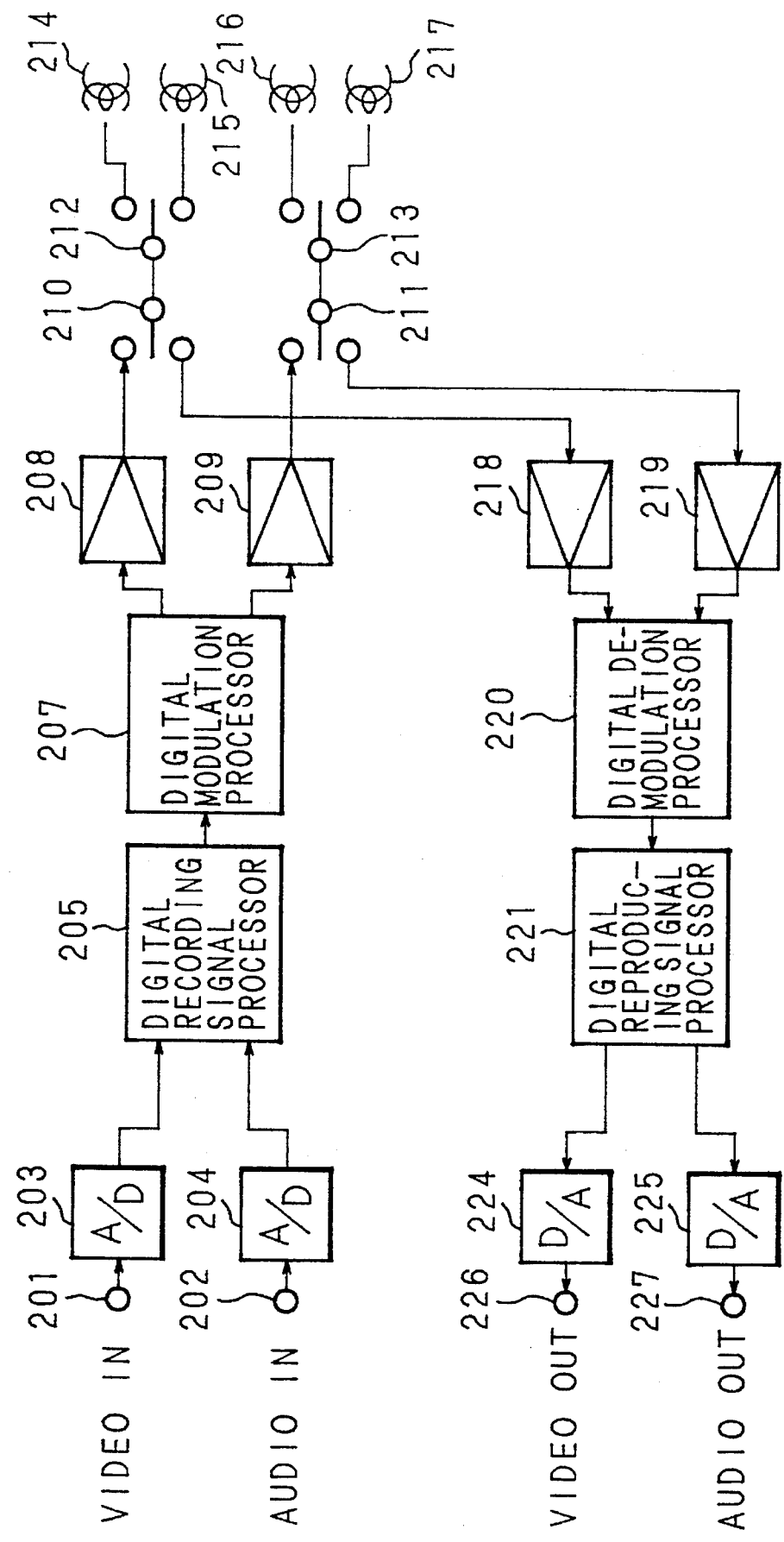
FIG. 1 is a block diagram showing the configuration of a digital signal recording and reproducing apparatus of prior art.
Figure 2:
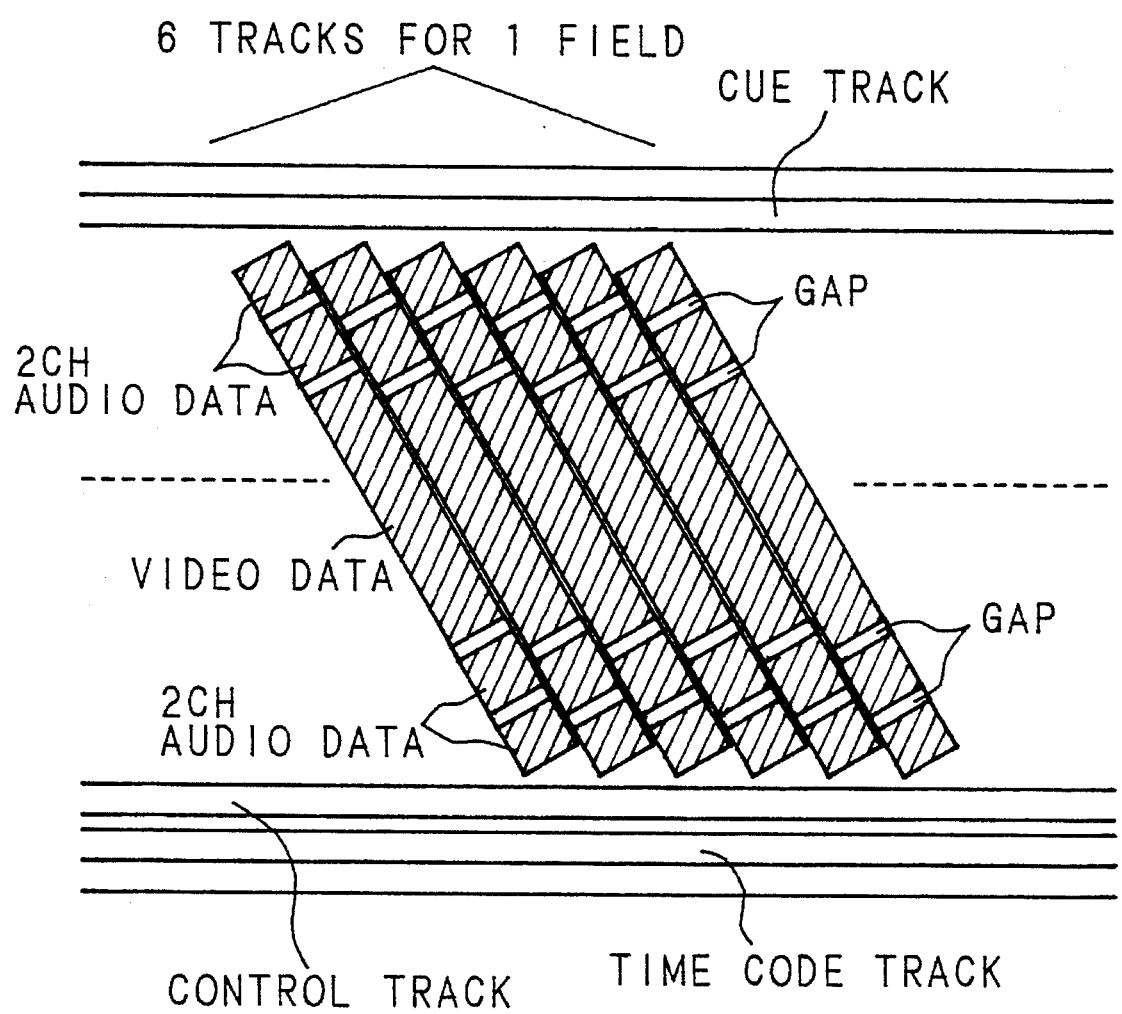
FIG. 2 is a diagram showing a track format for recording on tape according to prior art.
Figure 3:
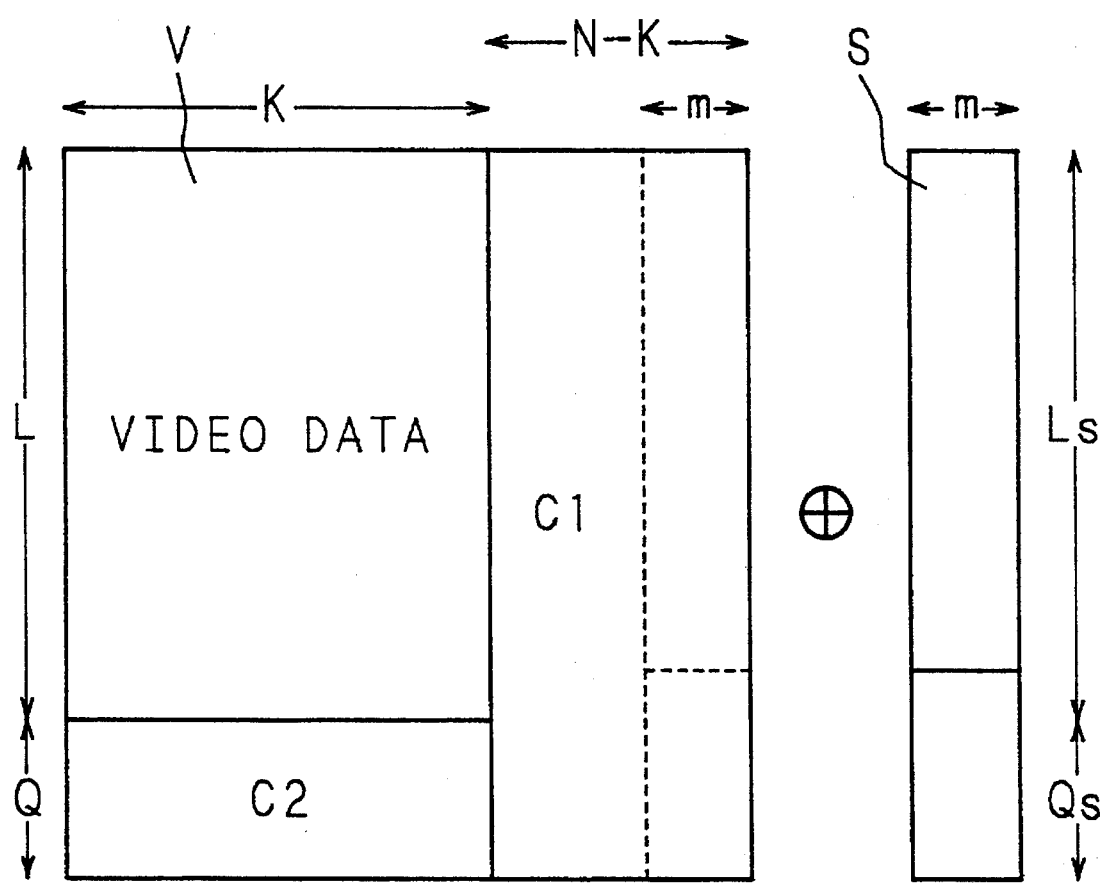
FIG. 3 is a diagram showing an error-correction coding format for a punctured code or superimposed code according to prior art.
Figure 4:
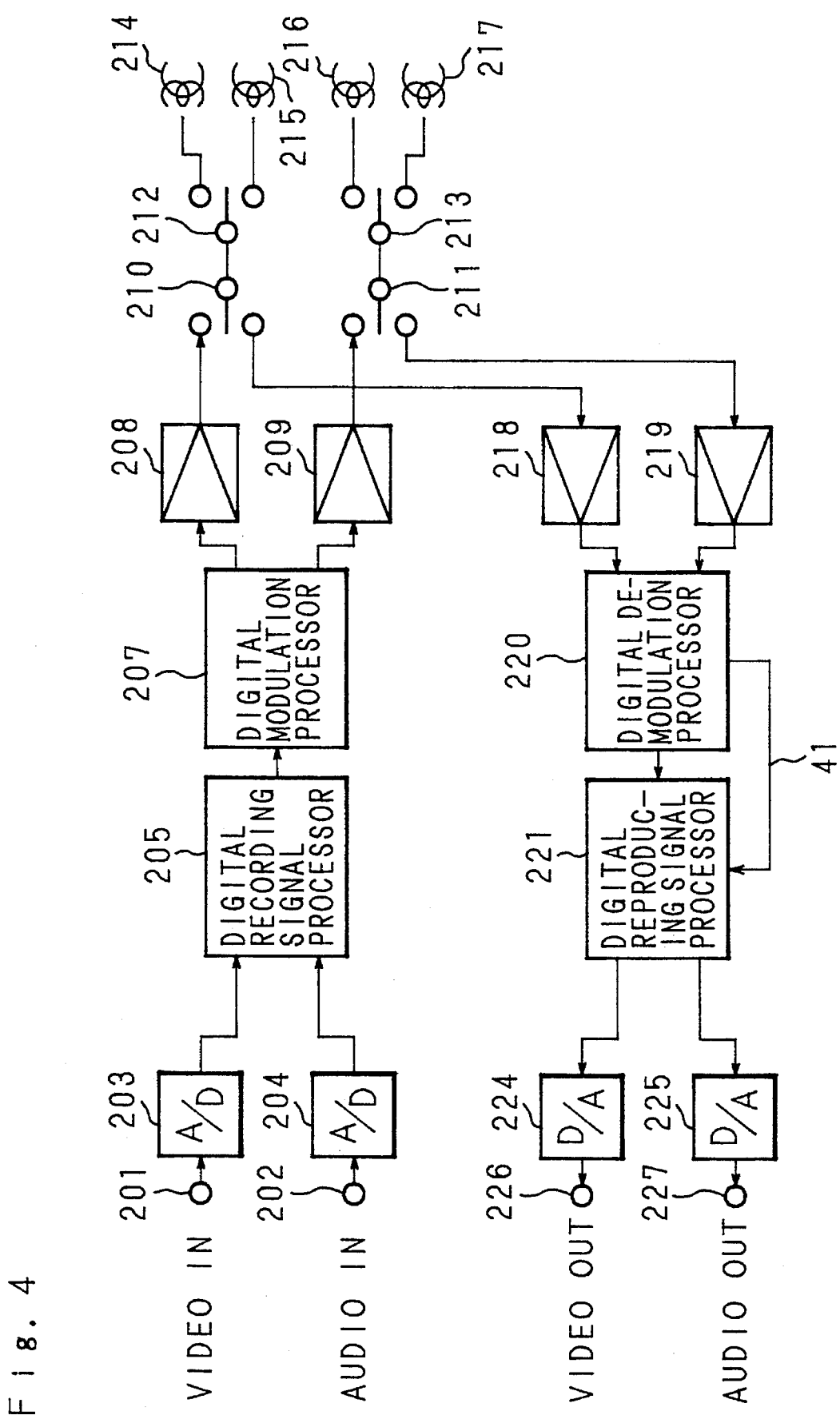
FIG. 4 is a block diagram showing the configuration of a digital signal recording and reproducing apparatus according to the invention.

FIG. 4 is a simplified block diagram showing an example of a home-use digital VTR according to the invention. In FIG. 4, the same reference numerals as used in FIG. 1 designate the same or corresponding parts to those shown in FIG. 1.

The operation of the digital VTR of the invention will now be described with reference to FIG. 4. The composite video signal input at the input terminal 201 is quantized by the A/D converter 203 into an eight-bit digital signal at a frequency four times the subcarrier frequency, i.e., at 14.318 MHz. On the other hand, the audio signal input at the input terminal 202 is quantized at 48 k Hz into a 16-bit digital signal, using the A/D converter 204. For simplicity, only one channel of audio signal input is shown in FIG. 4, but actually, there are four audio input channels. The digitized video and four-channel audio signals are fed to the digital recording signal processor 205.

In the digital recording signal processor 205, the video signal is compressed, thereby reducing the data rate of the video signal, and necessary time-axis processing is performed on the compressed video signal and the four-channel audio signals to distribute them over ten tracks per frame, for example. Then, error-correction coding is performed for every track, and the video signal, audio signal, and INDEX signal are error-correction coded independently of one another. The data train with the error-correcting codes appended thereto is passed to the digital modulation processor 207. The digital modulation processor 207 appends an ATF signal to the data train for each track supplied from the digital recording signal processor 205 and performs digital modulation in accordance with a prescribed modulation scheme. The ATF signal may be appended after modulation.

Figure 6:
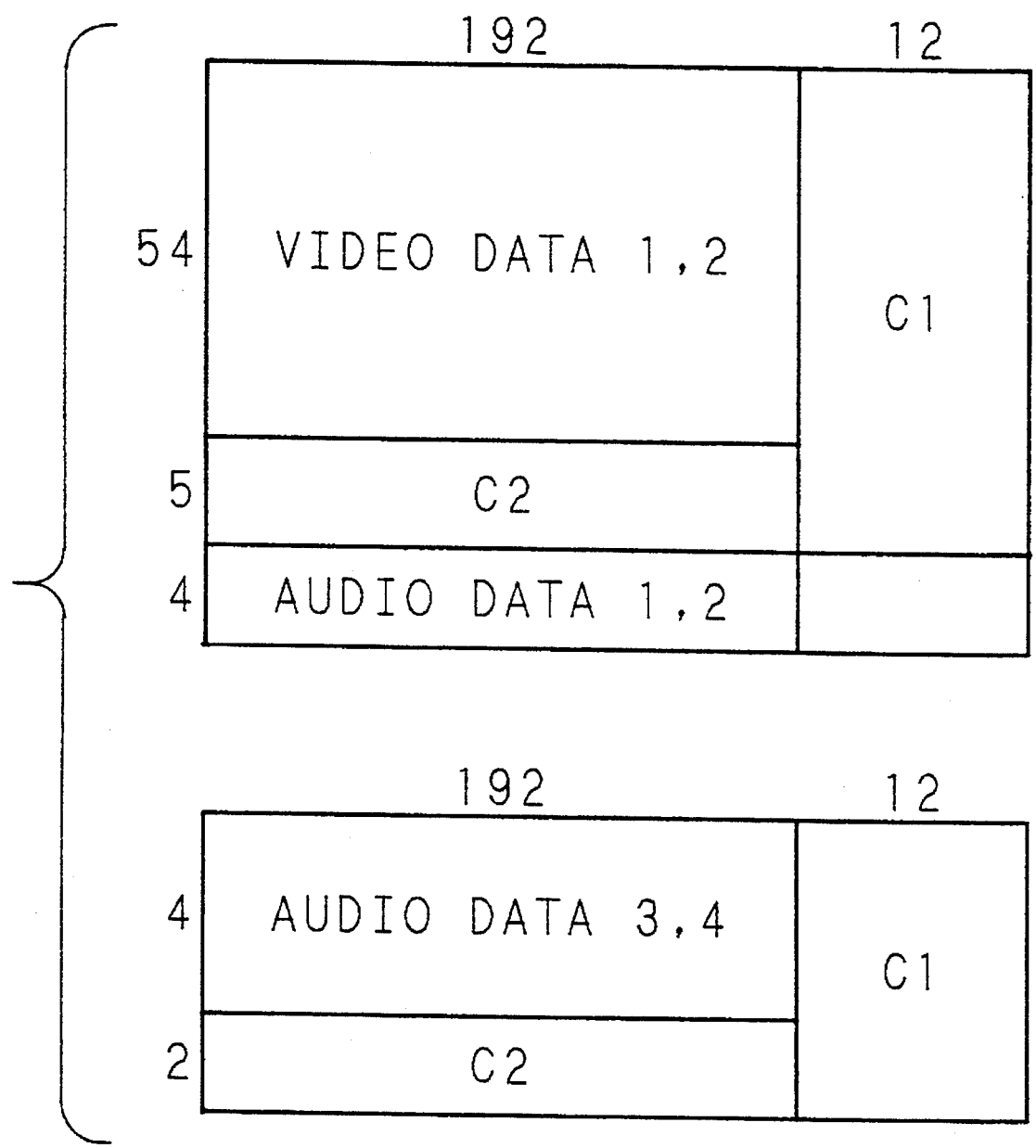
FIG. 6 is a diagram showing the format of error-correcting codes for track recording.

The signals output from the digital modulation processor 207 are fed to the recording amplifiers 208, 209, passed through the record/playback selecting switches 210, 211, and distributed via the head selecting switches 212, 213 over the heads 214, 215, 216, and 217 for recording onto the magnetic tape in accordance with the format shown in FIG. 6.

Reproduction of the signals is performed in the following manner. The signals reproduced by the heads 214, 215, 216, and 217 are fed, via the head selecting switches 212, 213 and the record/playback selecting switches 210, 211, to the playback amplifiers 218, 219 which amplify the reproduced signals before supplying them to the digital demodulation processor 220. The digital demodulation processor 220 extracts the ATF signal from each track, supplies it to a servo circuit (not shown), and performs digital demodulation on the data train from each track. The digitally demodulated data train is passed to the digital reproducing signal processor 221. At the same time, a fast-speed/normal-speed playback switching control signal 41 is supplied to the digital reproducing signal processor 221.

Figure 5:
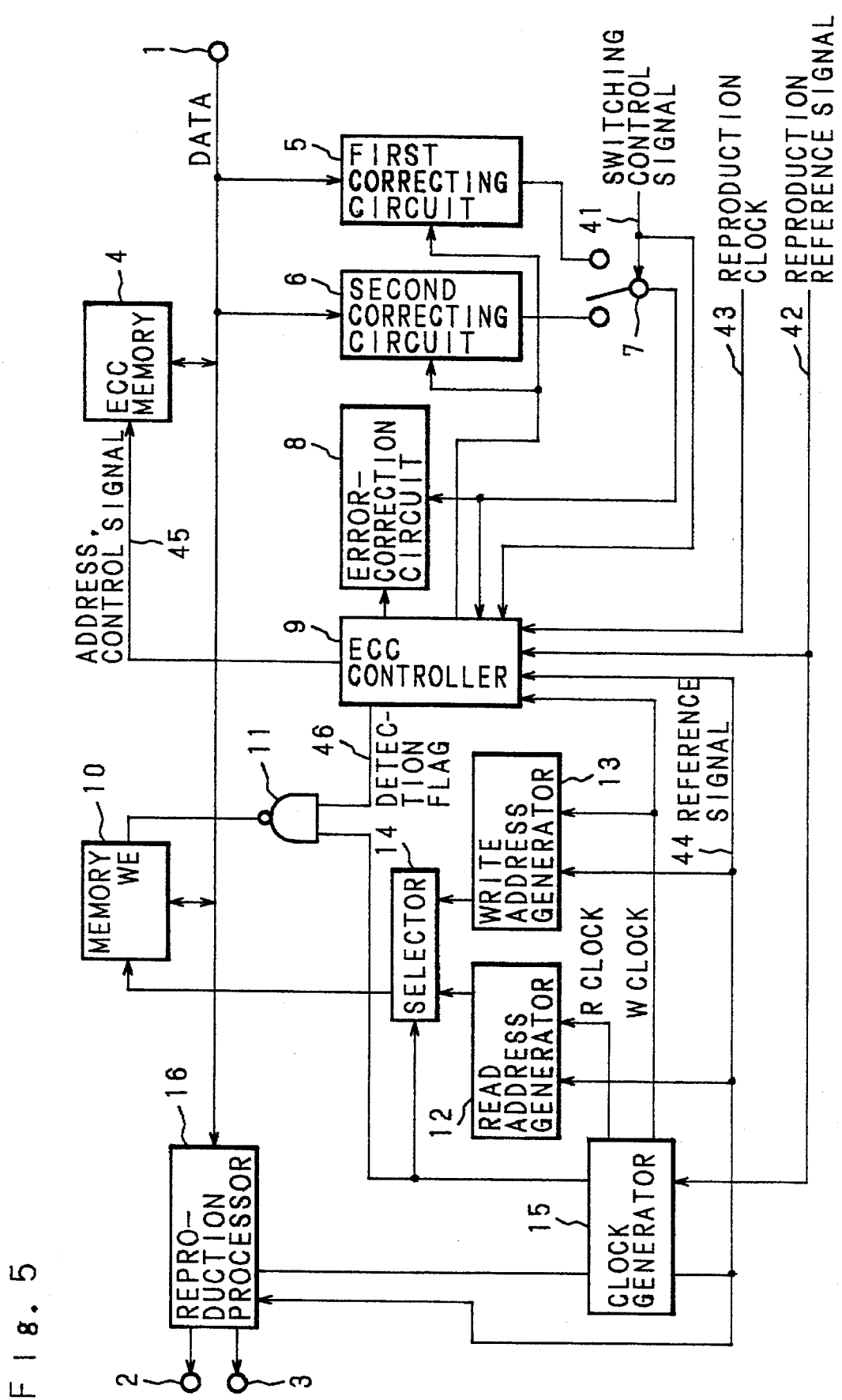
FIG. 5 is a block diagram showing the configuration of a digital reproducing signal processor in FIG. 4.

FIG. 5 is a block diagram showing the configuration of the digital reproducing signal processor 221 in FIG. 4. In FIG. 5, the reference numeral 1 is an input terminal, 2 is a video signal output terminal, 3 is an audio signal output terminal, and 4 is an ECC memory. Further, the reference numeral 5 designates a first correcting circuit containing a program or logic circuit for performing error correction for normal playback; the error correction is performed using C1 codes capable of correcting up to Tu errors and C2 codes. The numeral 6 denotes a second correcting circuit containing a program or logic circuit for performing error correction for fast speed playback; C1 decoding is performed for correction of up to Ts errors. The numeral 7 is a switch for selecting the output between the first and second correcting circuits 5 and 6 on the basis of the switching control signal 41 supplied from the digital demodulation processor 220, and the numeral 8 is an error-correction circuit for performing error correction on the basis of the error position and error number information supplied via the switch 7. The numeral 9 designates an ECC controller which generates a data write address and control signal for the ECC memory 4, on the basis of a reproduction reference signal 42 and a reproduction clock 43 from the demodulation system, and which generates a read address and control signal 45 for the ECC memory 4, control signals for the first and second correcting circuits 5 and 6, and a control signal for the error-correction circuit 8, on the basis of a write reference clock (W clock) and an ECC memory reference signal 44 supplied from a clock generator 15. The numeral 10 is a memory; 11 is a NAND gate; 12 is a read address generator for generating a read address for the memory 10 on the basis of a read reference clock (R clock) supplied from the clock generator 15; 13 is a write address generator for generating a write address for the memory 10 on the basis of the W clock; and 14 is a selector. The clock generator 15 generates the ECC memory reference signal 44 based on the reproduction reference signal 42 while supplying prescribed clock signals to the various parts described above. The reference numeral 16 designates a reproduction processor that performs high-efficiency decoding and appends synchronizing and burst signals.

The signal supplied via the input terminal 1 is processed for error correction by the first correcting circuit 5 or the second error correcting circuit 6, whichever selected by the switching action of the switch 7 based on the switching control signal 41, the first and second correcting circuits 5 and 6 having the error-correcting capabilities optimized for normal playback and fast speed playback modes, respectively. In the event of detection of an uncorrectable error, a detection flag 46 is output to inhibit data write to the memory 10, in order to perform interpolation using data from the preceding or older field. The data sequentially read from the memory 10 undergo high-frequency decoding and are appended with synchronizing and burst signals, etc. before being output at the output terminals 2 and 3.

The error-correcting codes of data recorded on the magnetic tape will now be described with reference to FIG. 6. FIG. 6 shows the error-correction coding format for the video and audio signals in normal recording mode. The C2 code shown is an error-correcting code formed in a direction perpendicular to the C1 code. In the error correction coding of data, double error-correction coding is often employed, in which case the data are first encoded with an outer code (also called a C2 code) and then encoded with an inner code (also called a C1 code). That is, the data are arranged in a two-dimensional array of $k_1 \times k_2$, the C1 code forming an $(n_1, k_1, d_1)$ inner code and the C2 code forming an $(n_2, k_2, d_2)$ outer code, where n is the code length, k is the information length, and d is the distance between code-words. The thus encoded data are scanned from the lower left to the right in FIG. 6, the scanning being repeated to produce tracks. As shown in FIG. 6, the video signal samples are written into a memory array of 54×192 bytes, double coding being done with a (204, 192, 13) Reed-Solomon code over $GF(2^8)$ in horizontal direction and with a (59, 54, 6) Reed-Solomon code in vertical direction. On the other hand, the two-channel audio signal samples are arranged in a memory array of 4×192 bytes, coding being done with a (202, 192, 13) Reed-Solomon code. The samples for the audio channels 3 and 4 are arranged in an array of 4×192 bytes, separated by a gap from the video and-the audio channels 1 and 2, coding being done with a (204, 192, 13) Reed-Solomon code in horizontal direction and with a (6, 4, 3) Reed-Solomon code in vertical direction.

Figure 7:
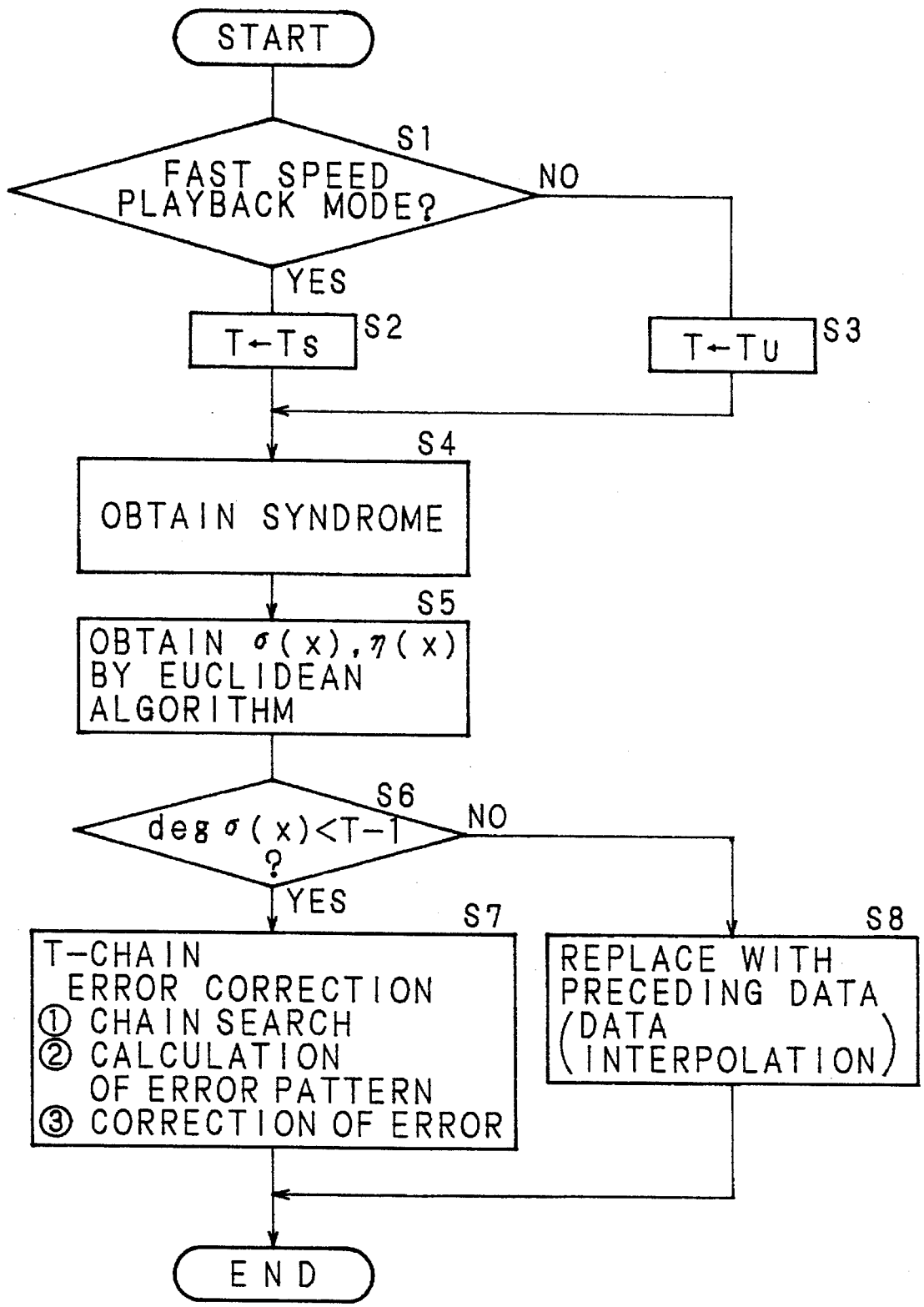
FIG. 7 is a flowchart explaining an error correcting operation.

FIG. 7 is a flowchart showing an error correction procedure using the C1 code. First, it is determined whether the playback mode is by normal speed or by fast speed (step S1). In the case of fast speed playback mode, the error-correcting capability T of the C1 code is set at Ts (Ts<$[(d_1-1)/2]$) (step S2), whereas in the case of normal speed playback mode, the error-correcting capability T of the C1 code is set at Tu (Tu$\leq[(d_1-1)/2]$) (step S3). Here, [x] denotes the largest integer contained in x, and it is assumed that Ts<Tu. Next, the syndrome is obtained (step S4). Then, using the Euclidean algorithm, the error position polynomial σ(x) and the error number polynomial η(x) are obtained (step S5). It is then determined whether the degree of the position polynomial σ(x) is smaller than T−1 (step S6), thus determining whether the number of errors to be corrected is smaller than the number of correctable errors. If YES, that is, if the number of errors is within the correctable range, then T-chain error correction is performed (step S7) which includes chain search, calculation of the error pattern, and correction of the error. If NO, that is, if the number of errors is outside the correctable range, data write to the memory is inhibited in order to perform interpolation using data from the preceding or older field (step S8).

Figure 8:
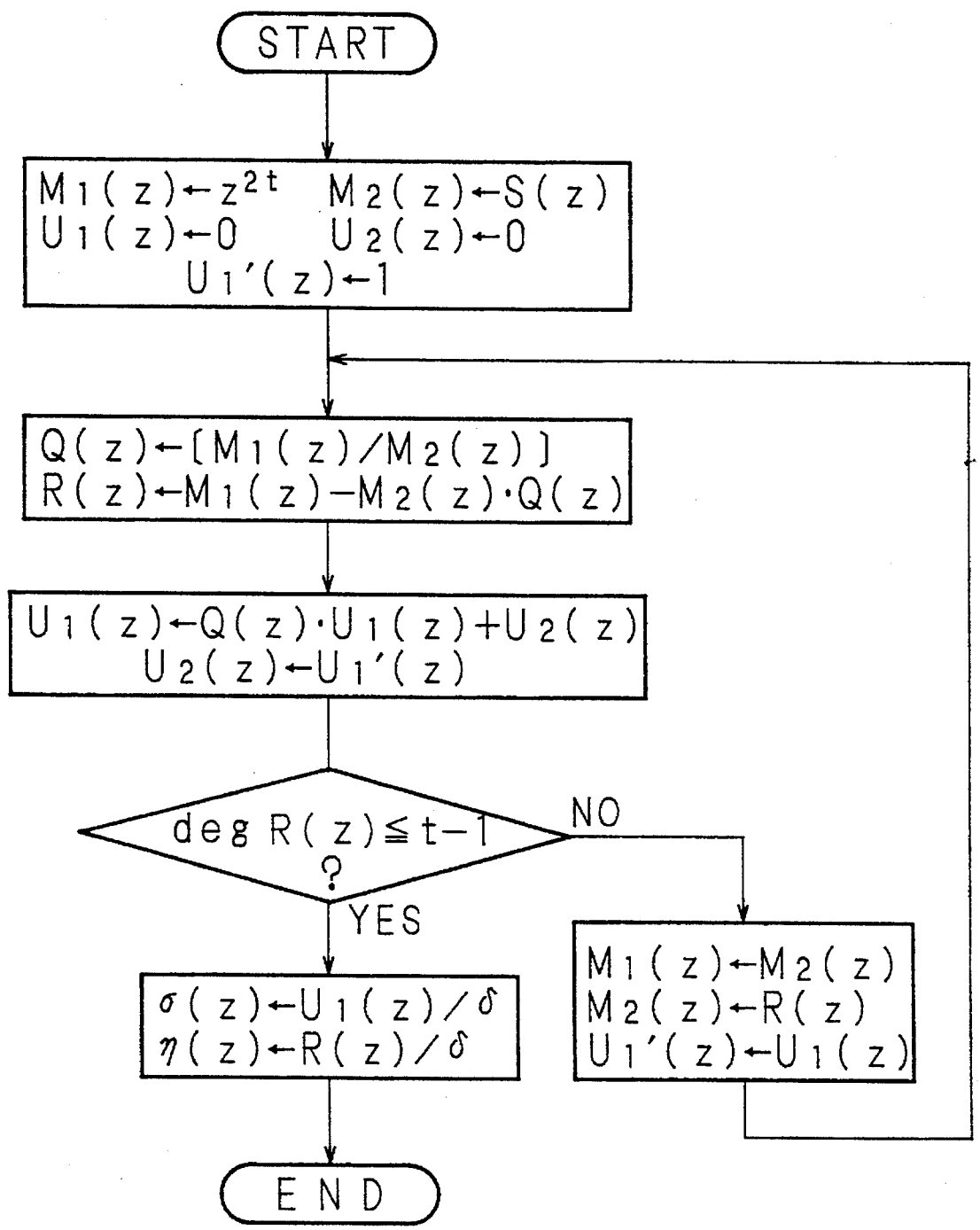
FIG. 8 is a flowchart explaining a decoding procedure by the Euclidean algorithm.

FIG. 8 shows the procedure of the Euclidean algorithm in step S5 of FIG. 7. First, the polynomial $Z^{2t}$ is substituted into $M_1(z)$, and the syndrome polynomial S(z) into $M_2(z)$, to initiate a series of divisions. When the degree of R(z) becomes less than t−1, the loop can be exited. In FIG. 8, t means T. In FIG. 8 "[]" represents quotient of division, and "δ" represents coefficient of maximum degree of $U_1(z)$.

The system disclosed in the previously mentioned Reference 1 will be taken as an example for further description.

Figure 9:
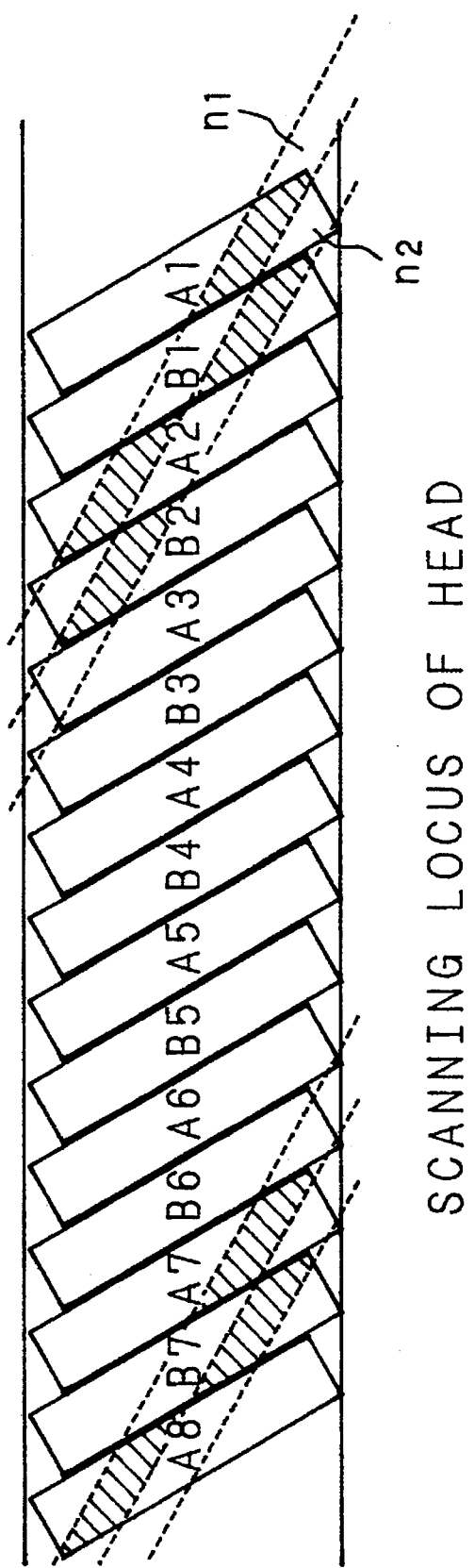
FIG. 9 is a diagram showing the tape track format and the scanning locus of heads during quintuple-speed playback.
Figure 10:
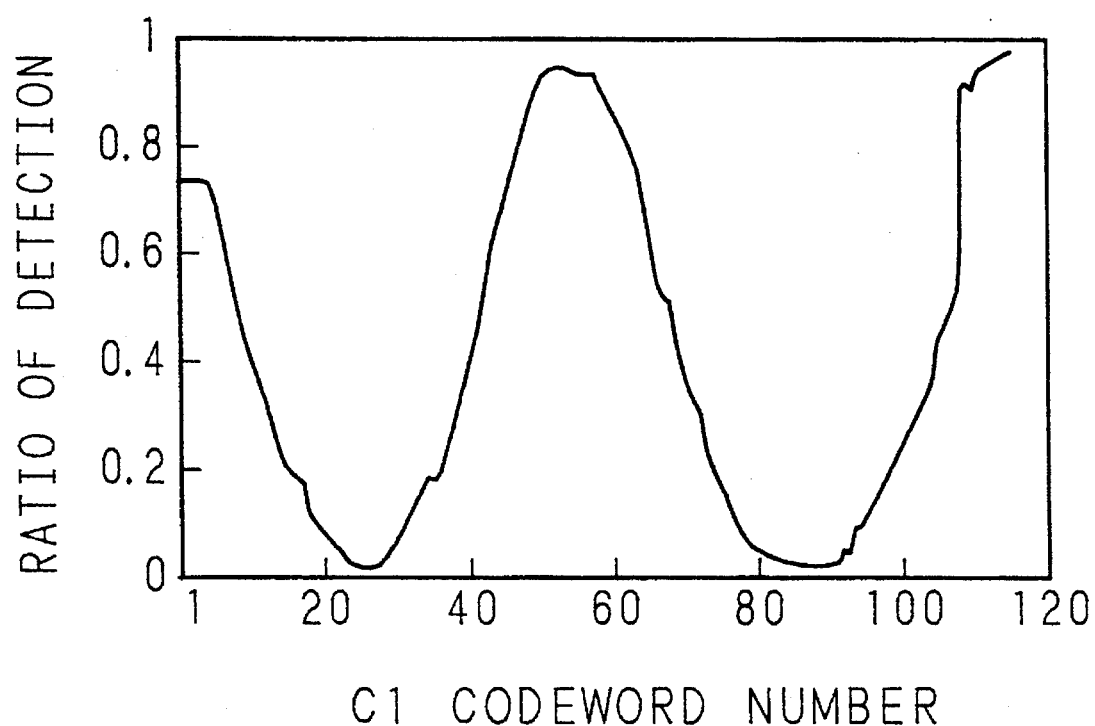
FIG. 10 is a diagram showing the distribution of detection in terms of ratio to all the C1 codewords.
Figure 11:
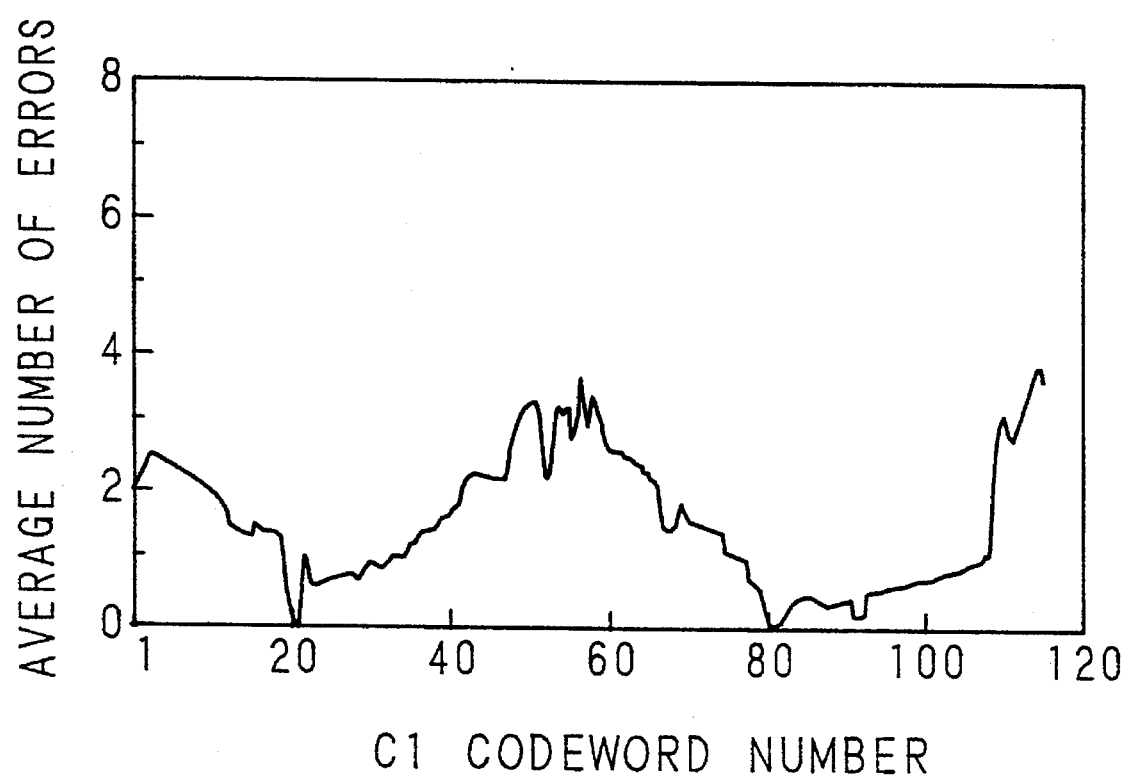
FIG. 11 is a diagram showing the distribution of errors in C1 codewords in terms of number.
Figure 12:
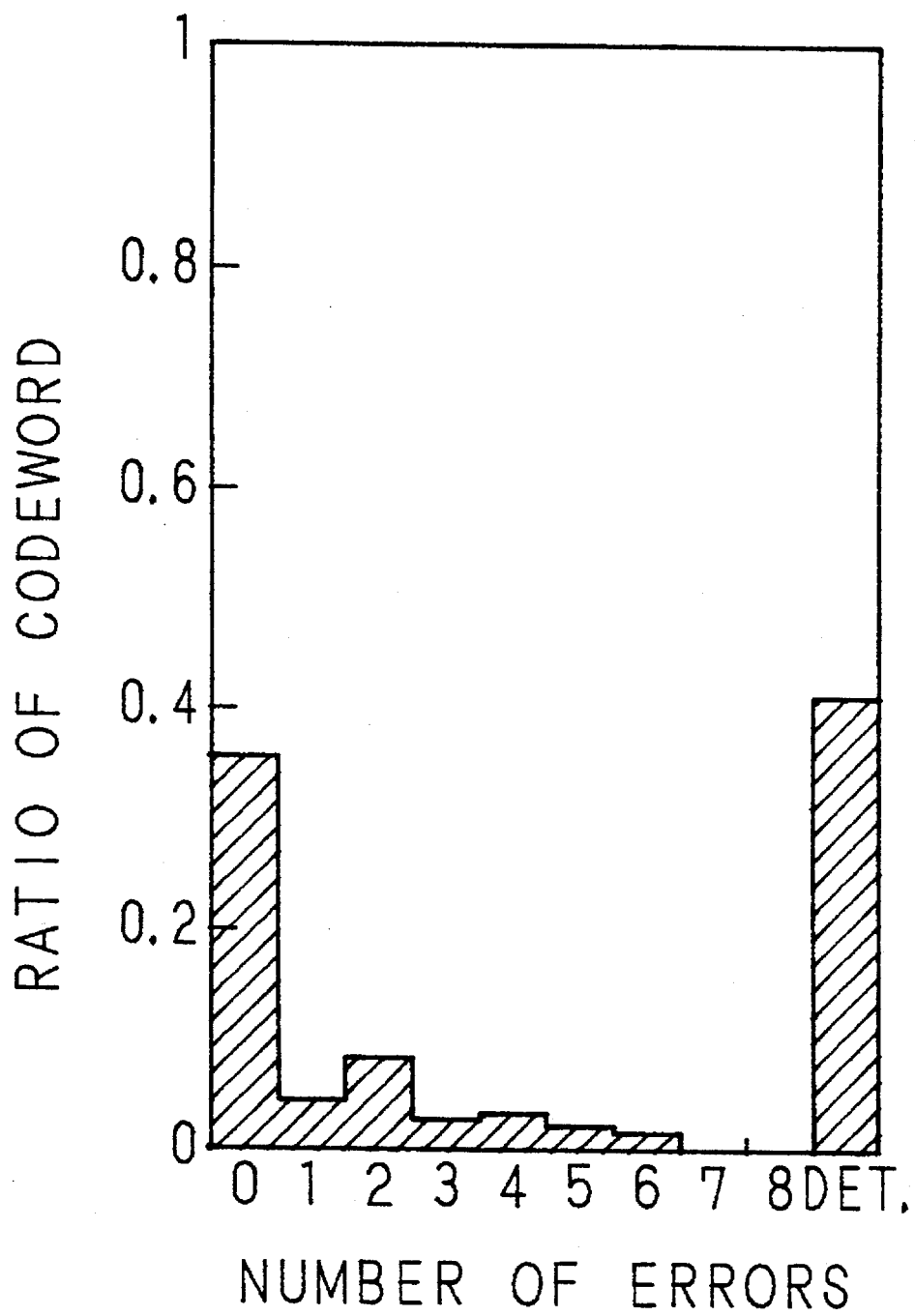
FIG. 12 is a diagram showing the distribution of error symbols in C1 codewords in terms of number.

FIG. 9 shows how the two channel heads sweep across the track pattern during fast speed playback (five times the normal speed). The recorded signal is reproduced by the two-channel heads, but during fast speed playback, only part of the data can be reproduced by the heads. That is, only the portions indicated by oblique lines in FIG. 9 are read by the two-channel heads, so that some data are reproduced correctly but other data are not, as shown in FIGS. 10 and 11. In FIG. 10, the C1 codeword position number is plotted along abscissa and the ratio of detection (to all the C1 codewords) along the ordinate. In FIG. 11, the C1 codeword position number is plotted along the abscissa and the number of error symbols in each C1 codeword along the ordinate. FIG. 12 shows the ratio of the number of symbol errors 0, 1, 2, ... 7, and detection to all the C1 codewords. As can be seen, during quintuple-speed playback, about 60% of the C1 codewords are 6 or less symbol errors (including 0 errors) and about 40% of them are detection. This means that since the heads are moved in such a way as to traverse the tracks, the original image can be reproduced using the data reconstructible by the C1 code alone whose code format is shown in FIG. 6.

Figure 13:
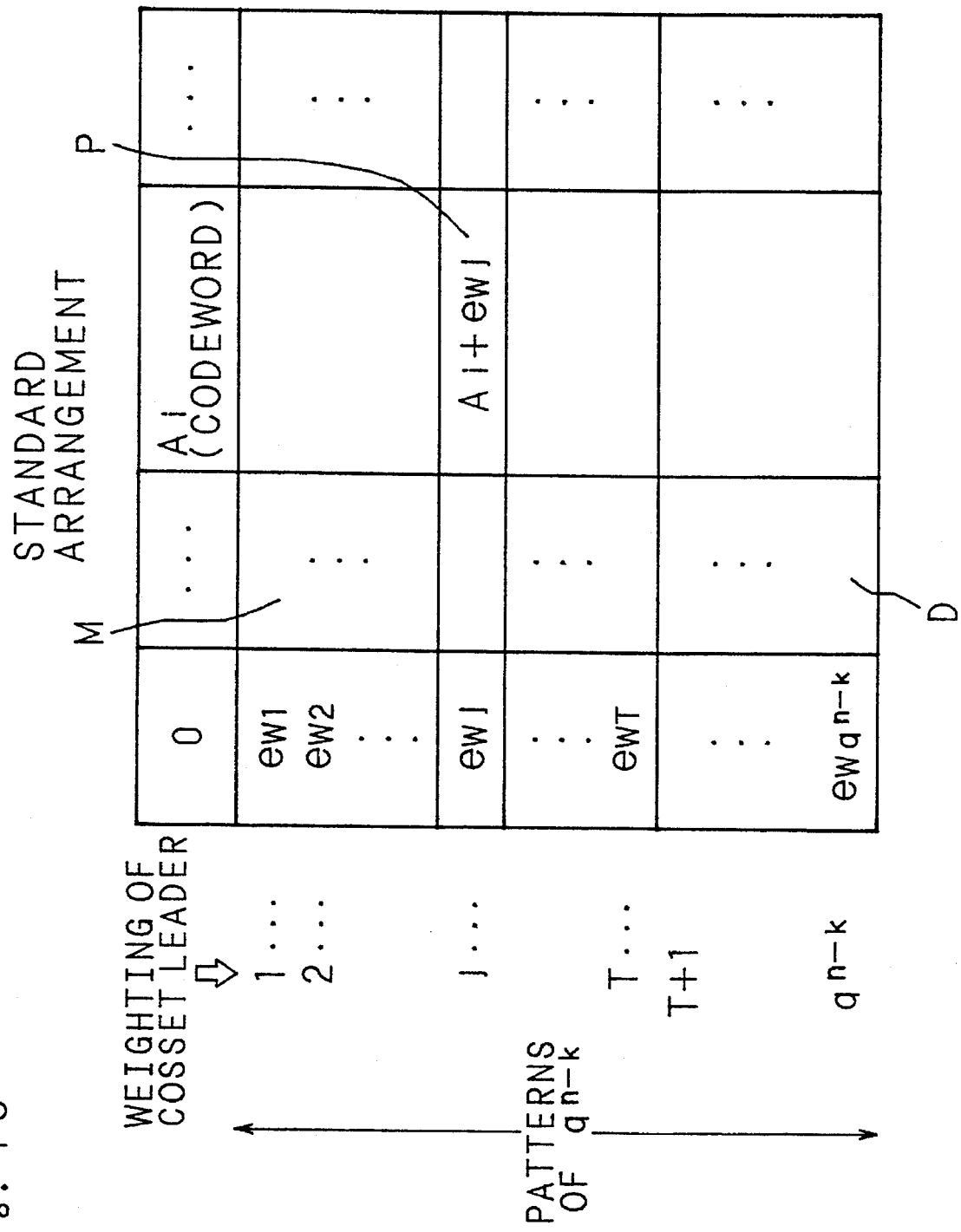
FIG. 13 is a diagram showing a standard arrangement for a code.

At this time, since about half of the C1 codewords always remain in nearly 100% error state, it becomes essential to prevent image quality degradation that may result from erroneous decoding due to error detection failure. It is therefore important that, data interpolation should be used while keeping the error correction well within the error correcting capability of C1, not trying to correct errors up to the full correcting capacity thereof. This will be explained below using the standard arrangement for the code shown in FIG. 13.

Here we consider a linear (n, k, d) code with q elements, and assume that the code C is capable of correcting up to T errors (where $T \leq [(d-1)/2]$). Assuming that the transmission channel is always in 100% error, the probability of error will be obtained as follows. First, a codeword consisting of all 0s, i.e., consisting of n symbols of 0, is placed in the leftmost column of the standard arrangement for the code C, and codewords of k information symbols each are arranged in sequence in the uppermost row. Error vectors are arranged in order of increasing weighting in the leftmost column below the all-zero codeword. The vector of weighting 1 is listed as $e_{w1}$, the vector of weighting 2 as $e_{w2}$, and so on, with the lowermost error vector having a weighting of $q^{n-k}$. The error vector in each leftmost column is called a coset leader. Below each codeword $A_i$, for example, in cell P in FIG. 13, we find a combined vector $e_{wj}+A_i$, a sum of the error pattern $e_{wj}$ of weighting $w_j$ and the codeword $A_i$.

The principle of error correction is as follows. The codeword pattern $A_i$ transmitted from the transmitting side and the error pattern $e_{wj}$ added to it on the transmission channel will result in the received codeword $R_j=A_i+e_{wj}$. For the received codeword pattern $R_j$, the error pattern $e_{wj}$ is obtained from the syndrome computation, error position polynomial, and error number polynomial, and the error pattern $e_{wj}$ is added modulo-2 to $R_j$, which gives $A_i+e_{wj}+e_{wj}=A_i$, thus reconstructing the transmitted codeword $A_i$. However, in a transmission channel that fails almost 100%, it is considered that all the error patterns in the standard arrangement are generated uniformly. If the entire standard arrangement is regarded as the standard arrangement for the error patterns, then the codewords $A_i$ in the uppermost row, except the all-zero codeword, are errors that coincide with the codewords. Also, the error patterns belonging to the coset leaders of weighting T or less, which are absorbed in $A_i$ for decoding, are all erroneously decoded as $A_i$. That is, all the error patterns belonging to the coset leaders of weighting 1 or less are erroneous correction patterns, except the error absorbed in the all-zero codeword; therefore, if the arrangement is divided into a coset area M belonging to the coset leaders of weighting T or less and a coset area D belonging to the coset leaders of weighting T+1 or over, then the patterns that belong to the coset leaders of weighting T or less are erroneously decoded, whereas the patterns that belong to the coset leaders of weighting T+1 or over are detected for errors. If the area absorbed into the all-zero codeword is disregarded as negligible, the proportion of the erroneous correction patterns to all the patterns is given by $$\frac{\sum_{m=0}^{T} \binom{n}{m} q^m}{q^{n-k}} \quad (1)$$

In a specific example, if the parameters shown in FIG. 6 are substituted, the proportion is $$\frac{\sum_{m=0}^{6} \binom{204}{m} (2^8)^m}{(2^8)^{12}} = 3.302 \times 10^{-4} \quad (2)$$

This means that erroneous decoding may occur one in every 3,028 codewords and may adversely affect the resulting image quality. This is because the error-correcting capability T has been set at 6 which is the same error-correcting capability T=6 for normal speed playback mode. If T is lowered to 4, for example, the probability of erroneously decoding codewords will decrease as shown in Equation (3) below.

$$\frac{\sum_{m=0}^{4} \binom{204}{m} (2^8)^m}{(2^8)^{12}} = 1.401 \times 10^{-56} \quad (3)$$

That is, the probability is reduced to one codeword in every $7.14 \times 10^{55}$ codewords, a negligible level that is sufficient to ensure reliability.

(Embodiment 2)

Figure 14:
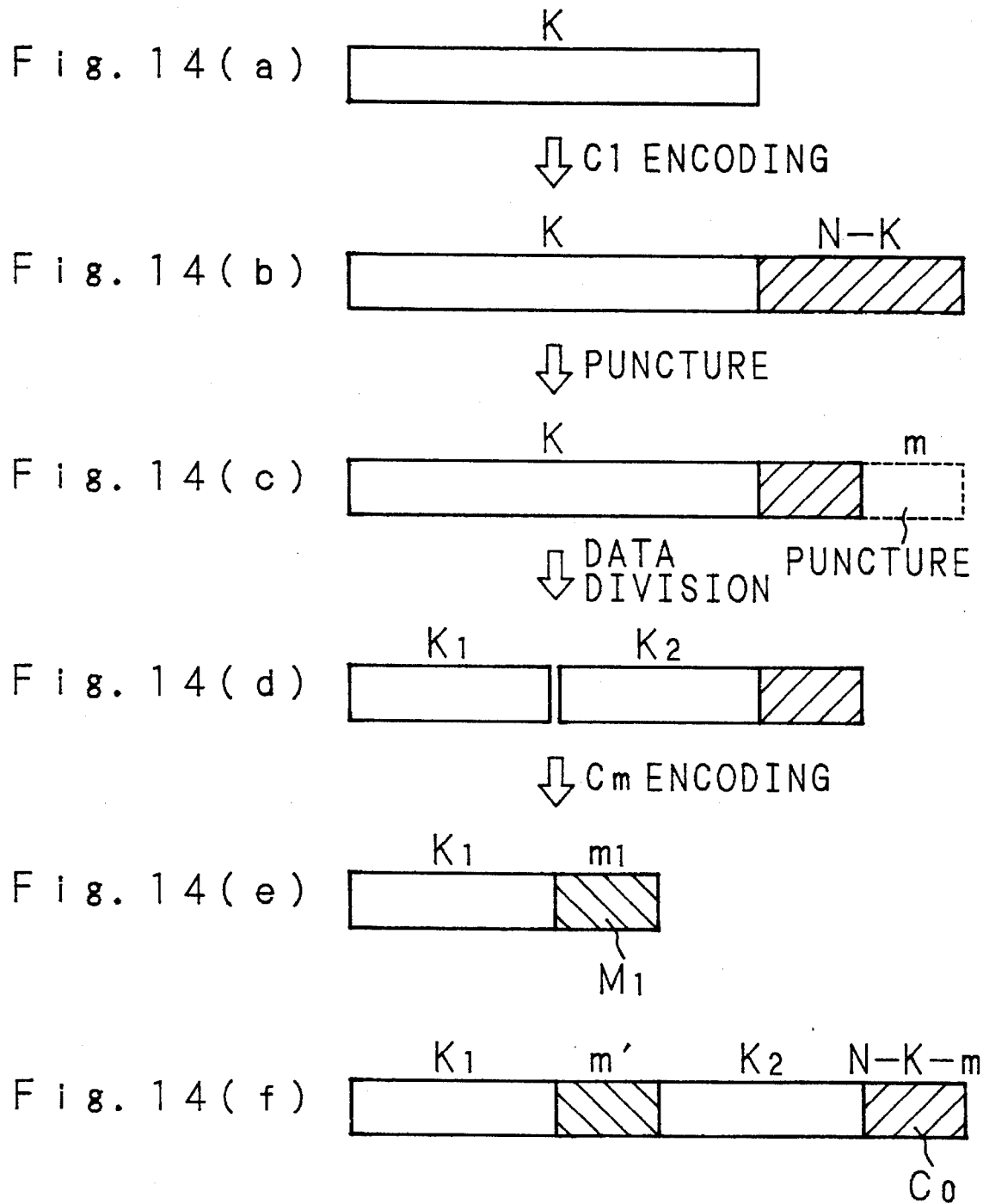
FIG. 14(a) is a diagram showing a coding format.
FIG. 14(b) is a diagram showing a coding format.
FIG. 14(c) is a diagram showing a coding format.
FIG. 14(d) is a diagram showing a coding format.
FIG. 14(e) is a diagram showing a coding format.
FIG. 14(f) is a diagram showing a coding format.

FIGS. 14 (a) to (f) are diagrams illustrating the coding format according to Embodiment 2. Information consisting of K symbols, as shown in the diagram (a), is encoded with an (N, K, $d_1$) code and appended with (N–K) check symbols, as shown in (b). Next, out of the (N–K) check symbols, m symbols are punctured, as shown in (c). The information of K symbols is divided into a block of $K_1$ symbols and a block of $K_2$ symbols, as shown in (d). The block of $K_1$ symbols is encoded and appended with $m_1$ check symbols, as shown in (e). The code has the property that if $m_1 \leq m$, the whole block fits inside the original N-symbol length after C1 coding. The thus obtained coded information (f) is then decoded.

C1 decoding is performed on the information of $(K_1+K_2)$ symbols and the check area $C_0$ of (N–K–m) symbols. The punctured m symbols are regarded as erasures when decoding. In the event of decoding failure, Cm decoding is performed on the first block of $K_1$ symbols using the check area $M_1$ of Cm. The syndrome for the C1 decoding is again obtained from the first of the $K_1$ symbols in the correctly decoded Cm codeword. Using the syndrome thus obtained, decoding is performed to obtain the minimum distance $d_1$. Since the errors that can be corrected by the Cm code are already eliminated, this method serves to enhance the error-correcting capability as compared with the decoding scheme using the prior art superimposed code (Reference 1) or punctured code (Reference 2).

The configuration of the home-use digital VTR for the implementation of Embodiment 2 is identical to that of Embodiment 1 shown in FIGS. 4 and 5. As in Embodiment 1, the signals output from the digital demodulation processor 207 are recorded on the magnetic tape in accordance with the format shown in FIG. 15. According to Embodiment 2, the first correcting circuit 5 in the digital reproducing signal processor 221 performs error correction using the C1 and C2 codes, while the second correcting circuit 6 performs Cm decoding for error correction.

Figure 16:
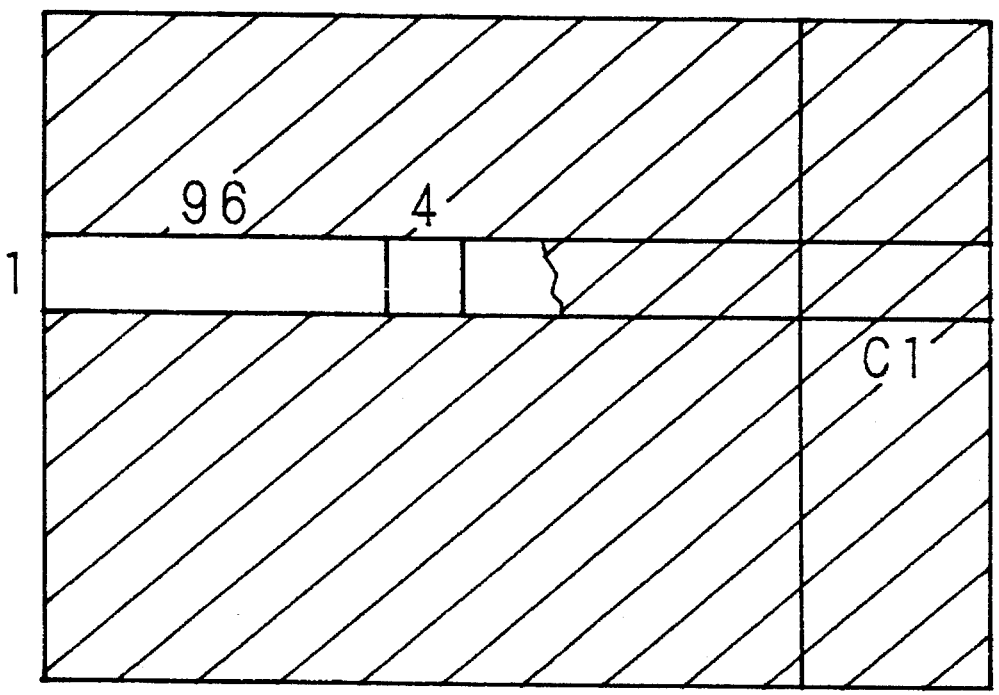
FIG. 16 is a diagram showing the format of an error-correcting code on a track being read during fast speed playback.

As previously described, during playback by fast speed several times faster than the normal speed, since the two channel heads are moved in such a way as to traverse the tracks, it is possible to reproduce the original image from the samples reconstructible by the C1 code alone. However, when the playback speed is further increased to ten to several tens of times the normal speed, the number of reconstructible codewords decreases, until the situation reaches a point where only the first half portion of only one C1 codeword can be read, as shown in FIG. 16. The present embodiment concerns a technique in which the low frequency components of the DCT coefficients of the image data compressed, for example, by discrete cosine transform (DCT) are recorded in areas that are still reproducible in such a situation, thereby ensuring a certain level of reproduction of the original image.

Figure 15:
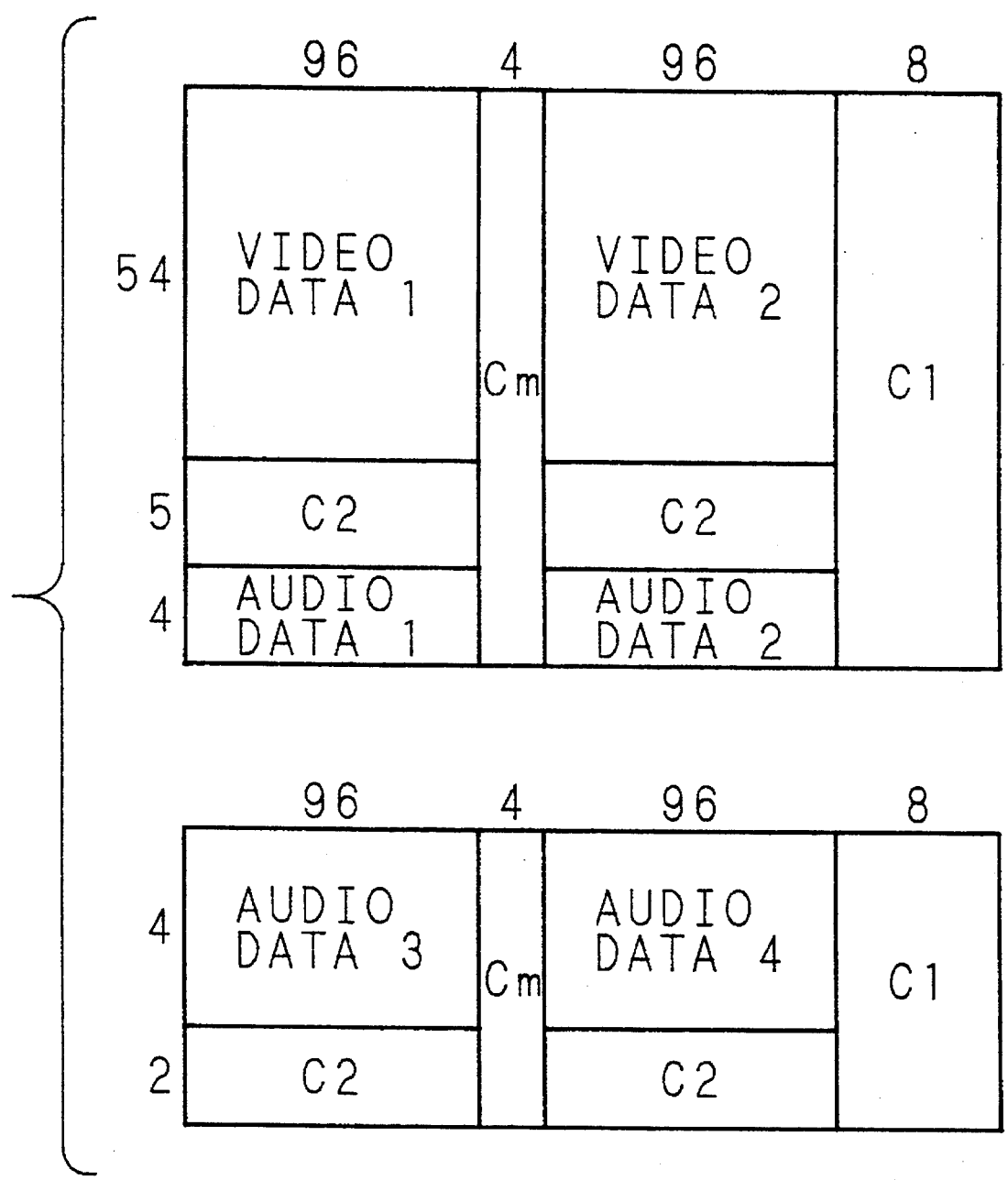
FIG. 15 is a diagram showing the format of error-correcting codes for track recording.

Referring to FIG. 15, we will describe the error-correcting codes of data recorded on the magnetic tape. FIG. 15 shows the error-correction coding format for the video and audio signals in normal recording mode. In the error correction coding of data, double error-correction coding is often employed, in which case the data are first encoded with an outer code (also called a C2 code) and then encoded with an inner code (also called a C1 code). That is, the data are arranged in a two-dimensional array of k×k, the C1 code forming an $(n_1, k_1, d_1)$ inner code and the C2 code forming an $(n_2, k_2, d_2)$ outer code, where n is the code length, k is the information length, and d is the distance between codewords. The thus encoded data are scanned from the lower left to the right in FIG. 15, sequentially progressing from bottom to top, repeating the scanning to produce tracks. As shown in FIG. 15, the video signal samples are written into a memory array of 54×192 bytes, double coding being done with a (204, 192, 13) Reed-Solomon code over $GF(2^8)$ in horizontal direction and with a (59, 54, 6) Reed-Solomon code in vertical direction.

C1 coded check symbols of 12 bytes are appended, four bytes of which are punctured and reserved for the check symbols for Cm coding. Next, Cm coding is performed on the first 92 symbols in each 192-byte information block, and four check symbols are appended. The audio blocks are encoded in a similar manner to complete the coding format shown in FIG. 15. When the playback speed is increased to about ten or more times the normal playback speed, only one C1 codeword, and only the first half of the only one C1 codeword, can be read, notwithstanding which the present embodiment enables the image to be reproduced by correcting errors to a certain degree using the error-correcting code Cm in the first half of the codeword.

Figure 17:
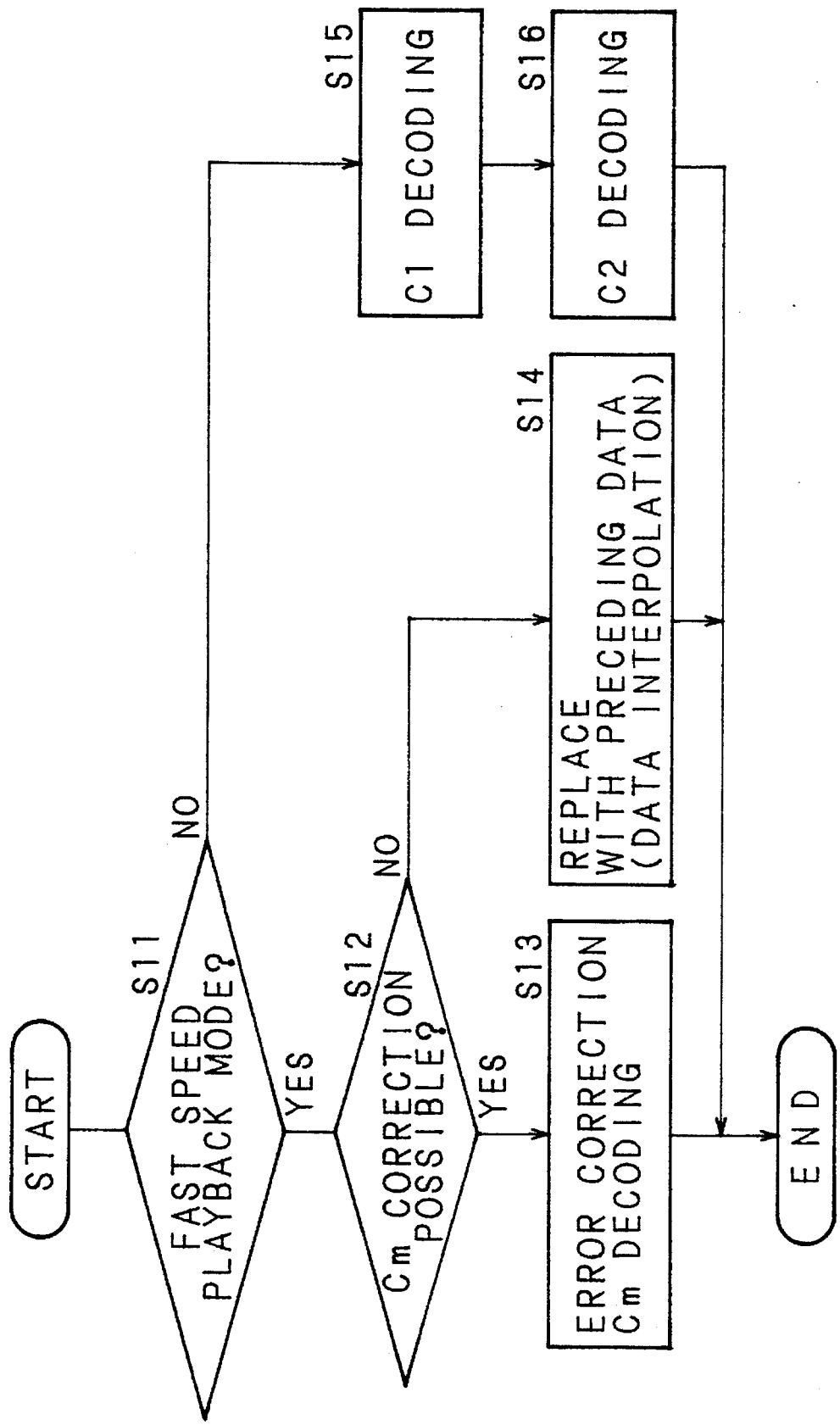

FIG. 17 is a flowchart explaining the error correcting operation according to Embodiment 2. First, it is determined whether the playback mode is by normal speed or by fast speed (step S11). In the case of fast speed playback mode, it is then determined whether error correction by Cm decoding is possible (step S12). If it is determined that the correction is possible, Cm decoding is performed for error correction (step S13). If it is determined that the correction is not possible, interpolation is performed using the data from the proceeding or older field (step S14). On the other hand, if it is determined that the playback mode is by normal speed, C1 decoding and C2 decoding are performed sequentially for correction of the errors (steps S15, S16).

(Embodiment 3)

Figure 18:
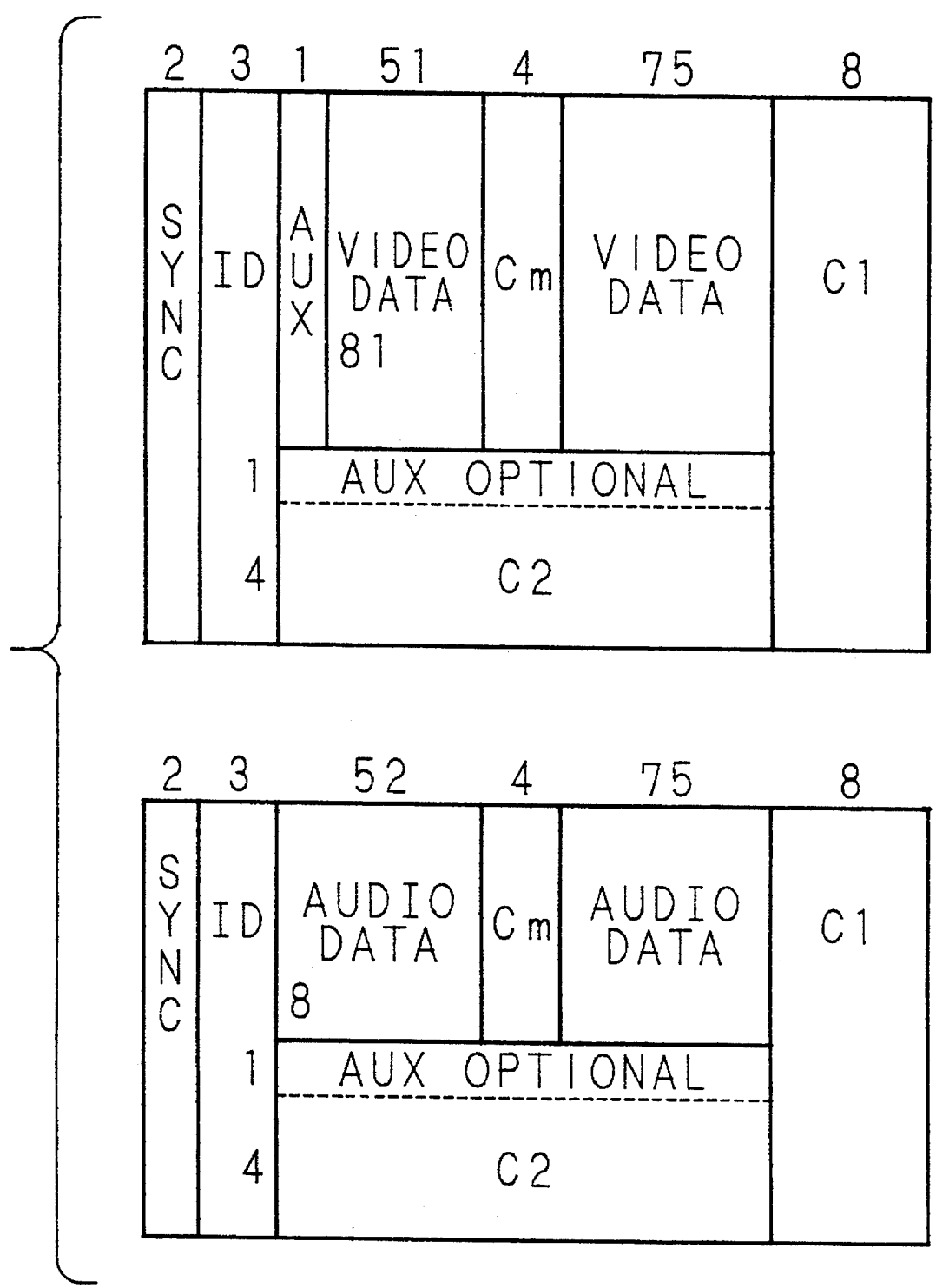
FIG. 18 is a diagram showing the format of an error-correcting code on a track.

FIG. 18 shows an alternative format of the error-correction coding used in Embodiment 2 for the video and audio signals in normal recording mode. In this embodiment, the video signal is arranged in a 81×126 bytes memory array, and double-coded with a (139, 127, 13) Reed-Solomon code over $GF(2^8)$ in horizontal direction anti with a (86, 81, 6) Reed-Solomon code in vertical direction. C1 coded check symbols of 12 bytes are appended, four bytes of which are punctured and reserved for the check symbols for Cm coding. Next, Cm coding is performed on the first 52 symbols in each 192-byte information block, and four check symbols are appended. The audio blocks are encoded in a similar manner to complete the coding format shown in FIG. 18. During fast speed playback ten times the normal playback speed, only one C1 codeword, and only the first half of the only one C1 codeword, can be read, as explained in the description of Embodiment 2 (see FIG. 16). As in Embodiment 2, the present embodiment enables the image to be reproduced even under such a condition by correcting errors to a certain degree using the error-correcting code Cm in the first half of he codeword.

Figure 19:
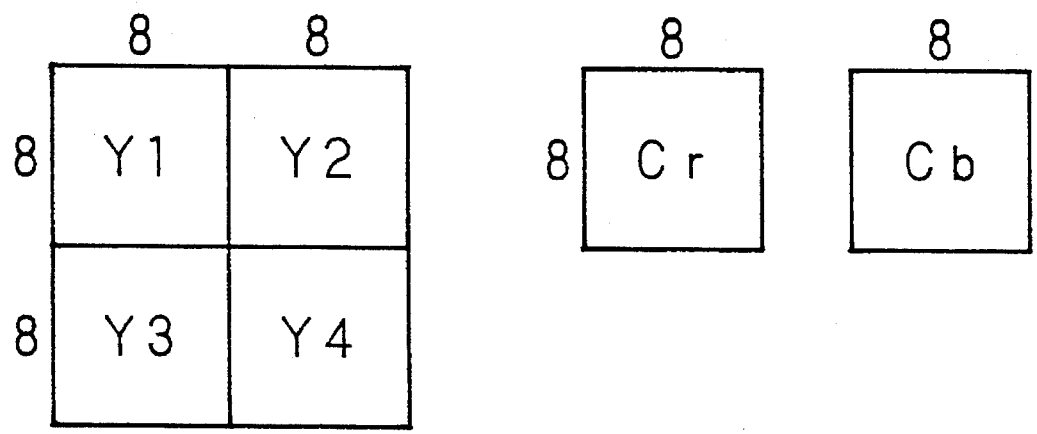
FIG. 19 is a diagram showing a 4:1:1 DCT transform format.
Figure 20:
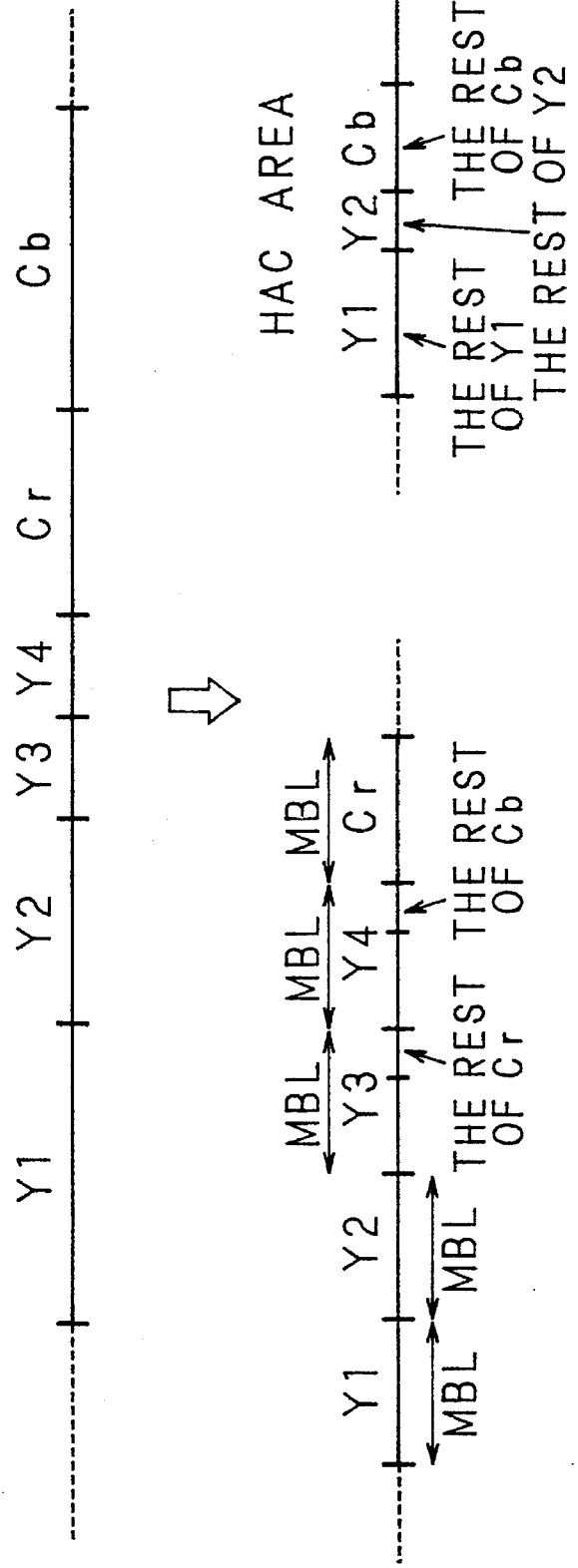
FIG. 20 is a diagram showing an example of data after DCT transformation and Huffman encoding.
Figure 22A:
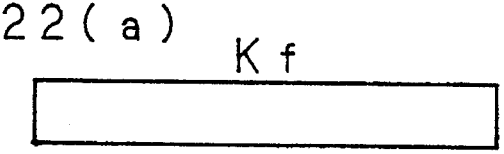
FIG. 22(a) is a diagram showing a coding format.
Figure 22B:
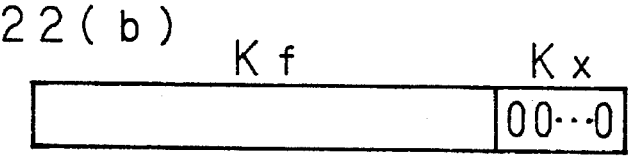
FIG. 22(b) is a diagram showing a coding format.
Figure 22C:
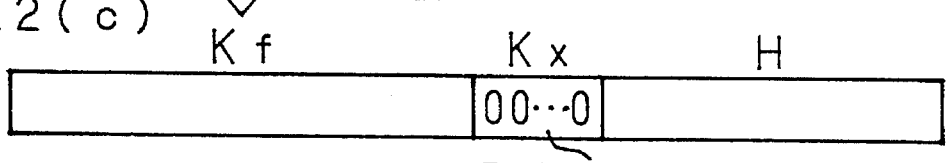
FIG. 22(c) is a diagram showing a coding format.
Figure 22D:
FIG. 22(d) is a diagram showing a coding format.
Figure 22E:
FIG. 22(e) is a diagram showing a coding format.
Figure 22F:
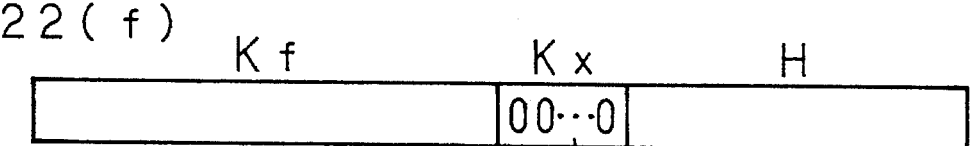
FIG. 22(f) is a diagram showing a coding format.
Figure 22G:
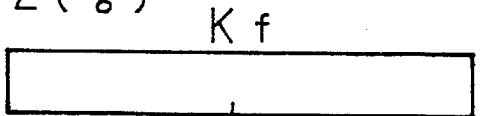
FIG. 22(g) is a diagram showing a coding format.
Figure 23A:
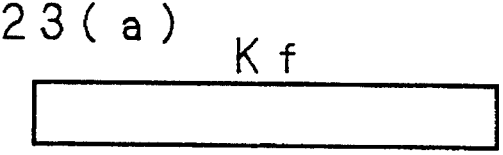
FIG. 23(a) is a diagram showing a coding format.
Figure 23B:
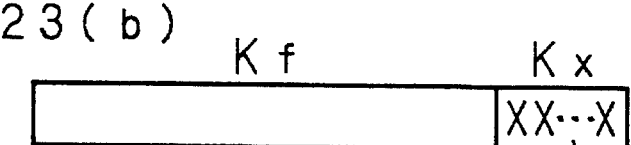
FIG. 23(b) is a diagram showing a coding format.
Figure 23C:
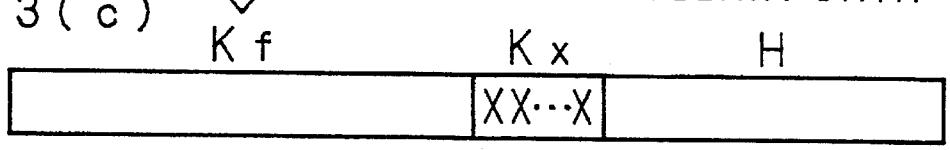
FIG. 23(c) is a diagram showing a coding format.
Figure 23D:
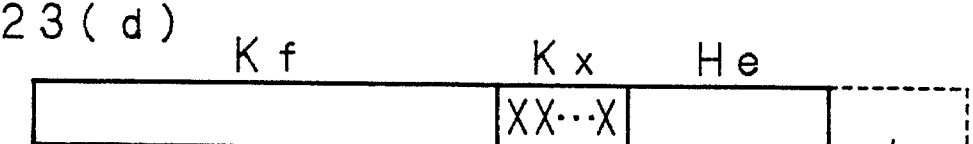
FIG. 23(d) is a diagram showing a coding format.
Figure 23E:
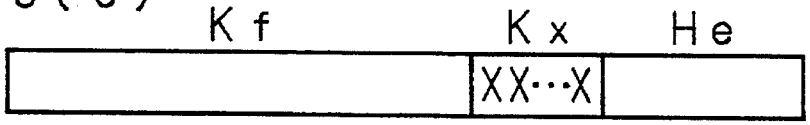
FIG. 23(e) is a diagram showing a coding format.
Figure 23F:
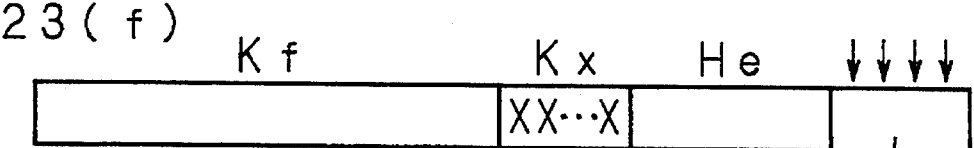
FIG. 23(f) is a diagram showing a coding format.
Figure 23G:
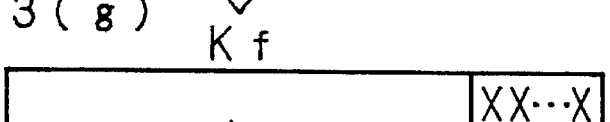
FIG. 23(g) is a diagram showing a coding format.

A specific example will be described below with reference to FIG. 19. The luminance signal (Y signal) of video data is sampled at 13.5 MHz, while the color-difference signals (Cr signal, Cb signal) are each sampled at ¼ of that frequency, i.e., at 3.4 MHz. The video data is divided into macroblocks each consisting of four 8×8-pixel luminance Y signal blocks, an 8×8-pixel color difference Cr signal block, and an 8×8-pixel color difference Cb signal block. When compressing video data by DCT or other technique, the macroblock is treated as a unit to constitute a image frame; therefore, if any one of the macroblocks cannot be reconstructed at the decoding side, the image to which the macroblock belongs cannot be reproduced. Video data shuffling is performed on every macroblock so that when transmission errors occur, the effects of the errors are spread out to make it easier to correct them from adjacent data. After shuffling, every macroblock is DCT-transformed, quantized, and Huffman-encoded into a bit string. The DCT blocks, Y1, Y2, Y3, Y4, Cr, and Cb in the macroblock, as shown in FIG. 19, are DCT-transformed for every 64 pixels, and Huffman-encoded into digital data in a time series as shown in FIG. 20. The data is formatted into an MB (macroblock) shown in FIG. 21. Each of the blocks Y1, Y2, . . . , Cb is assigned with an average number of blocks which is given by the expression MBL=64 bytes×R (compression ratio)×(⅔).

The data is then encoded in the coding format shown in FIG. 21(a). FIG. 21(a) shows three rows (three C1 codewords) taken from the array of FIG. 18, MB0, MB1, . . . , MB4 each designating a macroblock. Data of 15 DCT-transformed blocks is written in each row, i.e. each codeword. FIG. 20 shows the information bits of each block after DCT transformation and Huffman encoding. When data for one macroblock is generated in the order of Y1, Y2, Y3, Y4, Cr, and Cb, as shown in FIG. 20, the 64 bytes of Y1 are placed into the first MBL area of MB0 reserved for Y1. Any overflowing bits are placed in a HAC area in the last part of the same row, and if the HAC area becomes full, the bits overflown are placed in the HAC area of the second row, and finally, in the HAC area in the second half of the third row. HAC is an area for storing the high-frequency components of DCT coefficients. Information indicating the start bit position in each HAC area is written in the first Y1 area of MB0. Two units of data each representing 15 DCT blocks after compression are thus formatted in three rows, i.e. three codewords. If any one of the DCT-transformed blocks, Y1, Y2, Y3, Y4, Cr, and Cb, is not filled up to the assigned MBL bits, any vacant space is filled with components from other blocks. For example, when the length of Y2 is smaller than the MBL bits, the vacant space is filled with overflowing bits from Y3.

Suppose that Y1 is larger than MBL, as shown in FIG. 20. Overflowing data of Y1 placed in the HAC area represents the high-frequency components of Y1. The low-frequency components of Y1 are recorded within the macroblock. Likewise, the components of Y2 are divided between the Y2 area within the macroblock and the HAC area. If Y3 happens to be smaller than the MBL bits, there is a vacant space in the Y3 area, which is then filled, for example, with remaining bits of Cr. In this manner, the low-frequency components of each block data are stored within the macroblock in which a predetermined number of bits is reserved for each block. The remaining bits are stored in the HAC area. If there is a block having a higher compression ratio than the average, the vacant space in that block area is filled with high-frequency components.

After DCT transformation, if the size of DCT data representing 30 blocks exceeds that of three C1 codewords, the quantization table is changed, and DCT transformation and Huffman encoding are performed once again so that the data can be accommodated in three C1 codewords. In this manner, the low-frequency components of the block data are stored in the macroblocks, MB0, MB1, . . . , and the high-frequency components overflown from the macroblocks are sequentially placed in the HAC areas. FIG. 21($b$) shows the codeword formed in accordance with the coding format of the present embodiment. As shown, MB0, MB2, and MB4 are each Cm-coded and protected. MB1, MB3, and HAC are each protected with an eight-byte C1 code, along with the MB in the first half area. With this codeword construction, if the condition as shown in FIG. 16 continues during fast speed playback, the left-side macroblocks, MB0, MB2, and MB4, which are close to the synchronizing pattern, can be reproduced with a high probability, so that a coarse image can be reproduced using the low-frequency components. For the C1 code, four bytes need not necessarily be punctured and reserved for Cm code, as is done with the (139, 127, 13) RS code, but it will be appreciated that the same effect can be obtained if an ordinary RS code, for example, a (135, 127, 9) RS code, is used.

The 1×(52+4+75) bytes area lying below each of the video data and audio data areas is encoded with an (86, 81, 6) RS code, a Reed-Solomon code with d=6, if there is no auxiliary data added. On the other hand, if there is any auxiliary data added, the area is encoded with an (86, 82, 5) RS code. The presence or absence of auxiliary data is written in ID information, and the number of error-correcting check symbols is changed accordingly. FIG. 22 shows the coding format sequence when there is no auxiliary data added, and FIG. 23 shows the coding format sequence when auxiliary data is added.

FIG. 22($a$) shows fixed data Kf symbols long. If there is no auxiliary data added, the fixed data is encoded together with Kx "0" symbols (b). H check symbols are attached for information Kf+Kx (c). At the transmitting side (or recording side), the Kx "0" symbols are deleted and the data is transmitted (or recorded) as Kf+H symbols (d). At the receiving side, Kf+H symbols are reproduced (e), in which Kx "0" symbols are inserted for decoding (f), to reconstruct the data of Kf symbols (g). To describe the above with reference to the video format shown in FIG. 18, if the ID information indicates no auxiliary data added, data of 81 symbols and one "0" symbol, a total of 82 symbols, are coded in vertical direction, with five check symbols appended, and are thus stored in the table.

FIG. 23 shows the sequence when there is auxiliary data added. FIG. 23($a$) shows fixed data Kf symbols long. Auxiliary data of Kx symbols is added to the fixed data (b). The combined data is encoded to obtain H check symbols (c). From the H symbols, Kx symbols are deleted (punctured), and data consisting of the fixed data and auxiliary data, plus He (=H−Kx) check symbols, is transmitted (or recorded) (d). At the receiving side, the data is reproduced as Kf+H symbols (e). Since Kx check symbols have been deleted, Kx dummy symbols (of any value) are added, and error correction is performed regarding these symbols as erasures (f). The fixed data of Kf symbols and the auxiliary data of Kx symbols are output (g). In the process of error correction, Kx erasure patterns are obtained, but these patterns are not necessary and therefore discarded.

As is known (Reference 2), this encoding method can provides the same error-correcting capability, i.e. up to [He/2] errors ([x] is the Gaussian symbol denoting the largest integer contained in x), as would be obtained with a Reed-Solomon code of He symbols, and therefore, the error-correcting capability does not drop as a result of the above coding method. To describe with reference to FIG. 18, since the ID information notifies the presence of auxiliary data to the decoder, the decoder for vertical direction decoding regards the 81-symbol fixed data plus the one-symbol auxiliary data as constituting the information symbols, and decodes the data using the four check symbols and one erasure symbol.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An error-correcting apparatus for correcting errors caused on a transmission channel and/or a recording medium, comprising:

means for grouping compressed data into macroblocks each consisting of a prescribed number of luminance signal blocks and a prescribed number of color-difference signal blocks and for placing the data in fixed positions in an error-correcting code; and means for storing macroblocks of data in areas which correspond to each luminance and color-difference signal, each area having a prescribed number of bits and being filled completely with data of the corresponding one of the luminance signal and color-difference signals unless the data of the corresponding one of the luminance signal and color-difference signals is less than the prescribed number of bits, and for, when the length of at least one of the luminance signals and color-difference signals is smaller than the prescribed number of bits, forming blocks each consisting of the prescribed number of bits by filling a vacant space of an area, corresponding to the one of the luminance signals and color difference signals the length of which is less than the prescribed number of bits, with overflowing components from other luminance and color difference signals and thereafter performing error-correction coding on the data.

2. The apparatus of claim 14, wherein each macroblock includes plural luminance signals of 8×8 picture elements and color-difference signals (Cr signals and Cb signals) of 8×8 picture elements.

3. A method of correcting errors caused on one of a transmission channel and a recording medium, the method comprising the steps of:

(a) dividing compressed data into macroblocks, said compressed data including luminance data and color difference data, said step (a) including the steps of (a1) placing luminance data into a fixed length luminance data area of a macroblock such that said fixed length luminance data area is completely filled with said luminance data unless a length of said luminance data is less than a length of said fixed length luminance data area, and (a2) placing color difference data into a fixed length color difference data area of said macroblock such that said fixed length color difference data area is completely filled with said color difference data unless a length of said color difference data is less than a length of said fixed length color difference data area;

(b) placing said macroblocks into fixed positions of an error correcting code; and (c) placing compressed data overflowing from steps (a1) and (a2) in one of a partially filled luminance and color difference data area of said macroblock.

4. The method of claim 3, further comprising the steps of:

(d) performing error correction coding on said compressed data to obtain at least one error block; and (e) placing said error block in at least one error block position of said error correcting code.

5. The method of claim 3, wherein said step (a) divides compressed data into macroblocks which each include plural luminance data blocks of 8×8 pixels, a Cr color difference data block of 8×8 pixels, and a Cb color difference data block of 8×8 pixels.

6. The method of claim 3, wherein said error correcting code is encoded into a code having a predetermined code length.

7. The method of claim 3, wherein said compressed data are DCT blocks, and said error correcting code includes a predetermined number of said DCT blocks.

8. The method of claim 3, further comprising, prior to the step (a), the steps of:

(d) receiving video data;

(e) orthogonally transforming said video data into video data blocks; and (f) quantizing said video data blocks to produce said compressed data.

9. The method of claim 8, wherein said step (f) changes a quantization table used in said quantizing if said compressed data exceeds a predetermined amount.

10. The method of claim 3, wherein the fixed length luminance data area and fixed length color difference data area have equal lengths.

11. An apparatus for correcting errors caused on one of a transmission channel and a recording medium, comprising:

dividing means for dividing compressed data into macroblocks, said compressed data including luminance data and color difference data, and said dividing means placing luminance data into a fixed length luminance data area of a macroblock such that said fixed length luminance data area is completely filled with said luminance data unless a length of said luminance data is less than a length of said fixed length luminance data area, and placing color difference data into a fixed length color difference data area of said macroblock such that said fixed length color difference data area is completely filled with said color difference data unless a length of said color difference data is less than a length of said fixed length color difference data area; and storing means for placing said macroblocks into fixed positions of an error correcting code, and for placing compressed data overflowing said dividing in one of a partially filled luminance and color difference data area of said macroblock.

12. The apparatus of claim 11, further comprising:

error correcting means for performing error correction coding on said compressed data to obtain at least one error block; and wherein said storing means places said error block in at least one error block position of said error correcting code.

13. The apparatus of claim 11, wherein said dividing means divides said compressed data into macroblocks which each include plural luminance data blocks of 8×8 pixels, a Cr color difference data block of 8×8 pixels, and a Cb color difference data block of 8×8 pixels.

14. The apparatus of claim 11, wherein said error correcting code is encoded into a code having a predetermined code length.

15. The apparatus of claim 11, wherein said compressed data are DCT blocks, and said error correcting code includes a predetermined number of said DCT blocks.

16. The apparatus of claim 11, further comprising:

transform means for receiving video data and for orthogonally transforming said video data into video data blocks; and quantization means for quantizing said video data blocks to produce said compressed data.

17. The apparatus of claim 16, wherein said quantization means changes a quantization table used in said quantizing if said compressed data exceeds a predetermined amount.

18. The method of claim 11, wherein the fixed length luminance data area and fixed length color difference data area have equal lengths.

* * * * *

UNITED STATES PATENT AND TRADEMARK OFFICE
CERTIFICATE OF CORRECTION

PATENT NO. : 5,587,803
DATED : December 24, 1996
INVENTOR(S) : Inoue et al.

It is certified that error appears in the above-indentified patent and that said Letters Patent is hereby corrected as shown below:

Column 15, claim 2, line 1, please change "14" to --1--.

Signed and Sealed this

Eighth Day of April, 1997

Attest:

BRUCE LEHMAN

*Attesting Officer*  *Commissioner of Patents and Trademarks*